US 9,497,346 B2

(12) United States Patent
Baba

(10) Patent No.: US 9,497,346 B2
(45) Date of Patent: Nov. 15, 2016

(54) POWER SUPPLY CONTROL APPARATUS, IMAGE PROCESSING APPARATUS, AND NON-TRANSITORY COMPUTER READABLE MEDIUM

(71) Applicant: FUJI XEROX CO., LTD., Minato-ku, Tokyo (JP)

(72) Inventor: Motofumi Baba, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/299,404

(22) Filed: Jun. 9, 2014

(65) Prior Publication Data
US 2015/0103365 A1 Apr. 16, 2015

(30) Foreign Application Priority Data
Oct. 15, 2013 (JP) .................................. 2013-214902

(51) Int. Cl.
G06F 3/12 (2006.01)
H04N 1/00 (2006.01)
G06K 15/00 (2006.01)

(52) U.S. Cl.
CPC ........ H04N 1/00904 (2013.01); G06K 15/406 (2013.01); H04N 1/00323 (2013.01); H04N 1/00336 (2013.01); H04N 1/00891 (2013.01); H04N 1/00896 (2013.01); H04N 2201/0094 (2013.01); H04N 2201/0098 (2013.01)

(58) Field of Classification Search
CPC ................................ H04N 1/00896
See application file for complete search history.

(56) References Cited

U.S. PATENT DOCUMENTS

| 2004/0155963 | A1* | 8/2004 | Kondo ................... G05B 15/02 348/180 |
| 2005/0171741 | A1* | 8/2005 | Doi .................... G06K 9/00248 702/189 |
| 2010/0231390 | A1 | 9/2010 | Hashimoto |
| 2012/0092502 | A1* | 4/2012 | Knasel ................. G08B 13/196 348/159 |
| 2012/0127538 | A1* | 5/2012 | Mamiya ................ G06F 1/3231 358/442 |

(Continued)

FOREIGN PATENT DOCUMENTS

JP 05-045471 A 2/1993
JP 2002-015367 A 1/2002
(Continued)

OTHER PUBLICATIONS

Communication dated Dec. 2, 2014 from the Japanese Patent Office in counterpart application No. 2014-030438.

Primary Examiner — Charlotte M Baker
Assistant Examiner — Kevin Ky
(74) Attorney, Agent, or Firm — Sughrue Mion, PLLC

(57) ABSTRACT

A power supply control apparatus includes a sensor, a first imaging unit, a second imaging unit, and a state controller. The sensor senses a person when the power supply control apparatus is in a power saving state. The first imaging unit consumes higher power than the sensor and captures an image of a person approaching. The second imaging unit captures an image used to recognize a person. The state controller causes the first imaging unit and the second imaging unit to be in a power supply state in a case where the sensor has sensed a person.

15 Claims, 17 Drawing Sheets

(56) References Cited

U.S. PATENT DOCUMENTS

2013/0010335 A1* 1/2013 Baba et al. .................. 358/3.01
2014/0063528 A1* 3/2014 Hirose ......................... 358/1.13

FOREIGN PATENT DOCUMENTS

| JP | 2004-331051 A | 11/2004 |
| JP | 2007-279603 A | 10/2007 |
| JP | 2010160609 A | 7/2010 |
| JP | 2010-217303 A | 9/2010 |

* cited by examiner

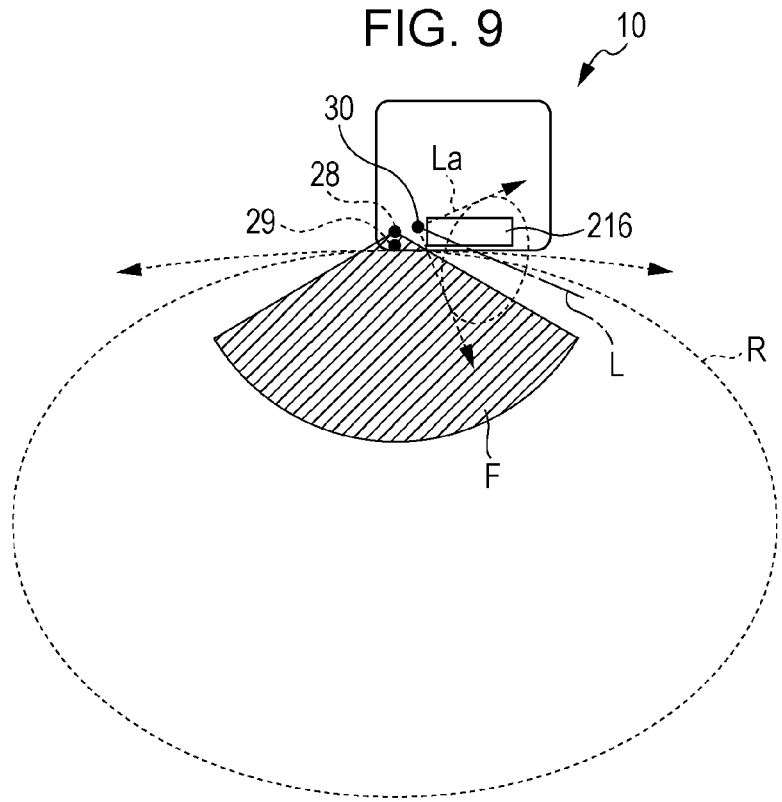
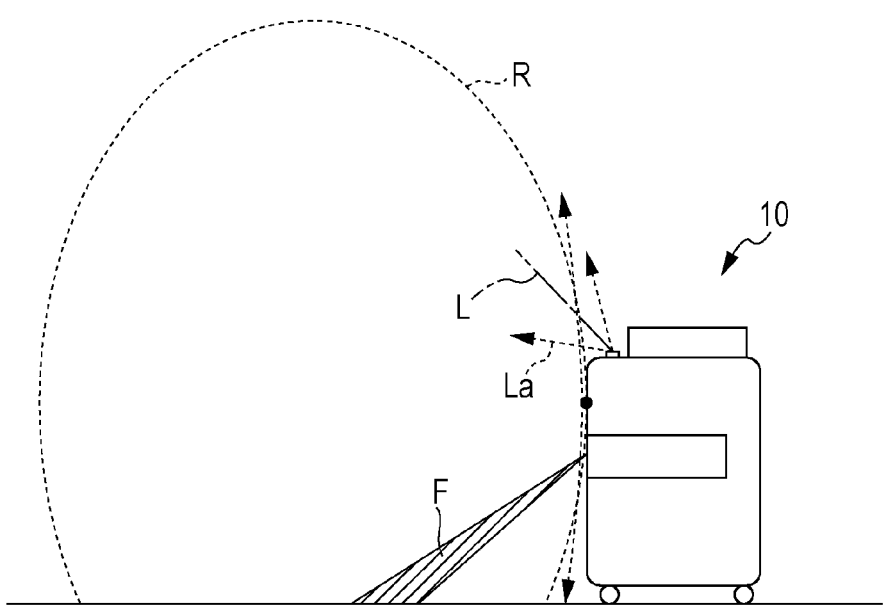

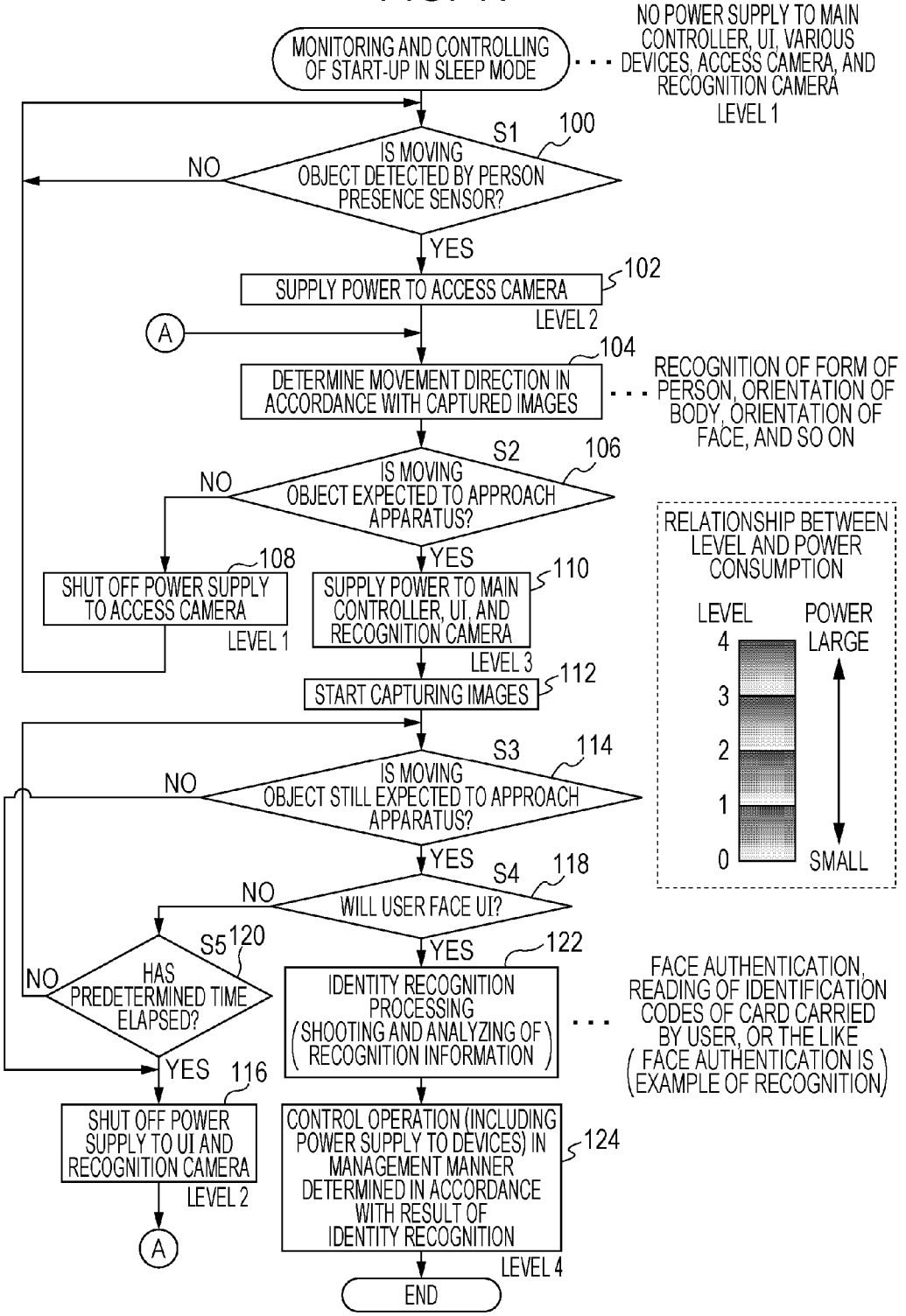

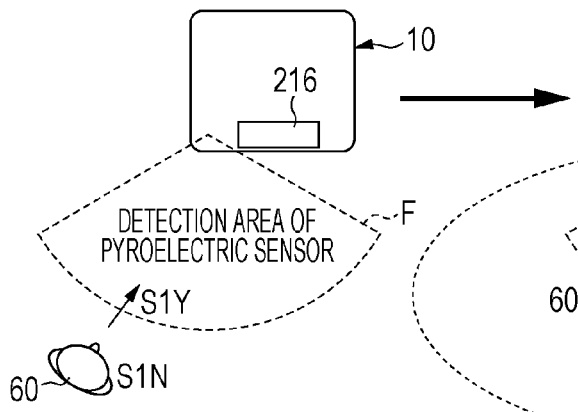
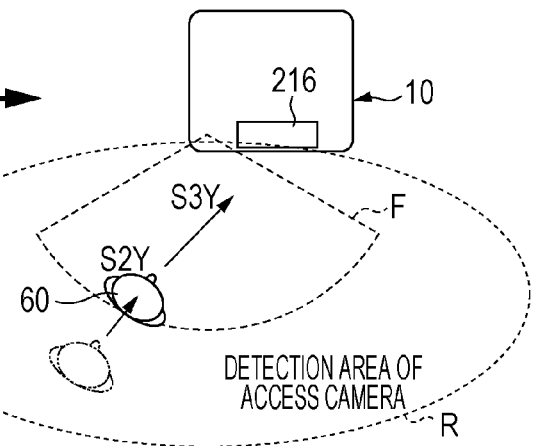
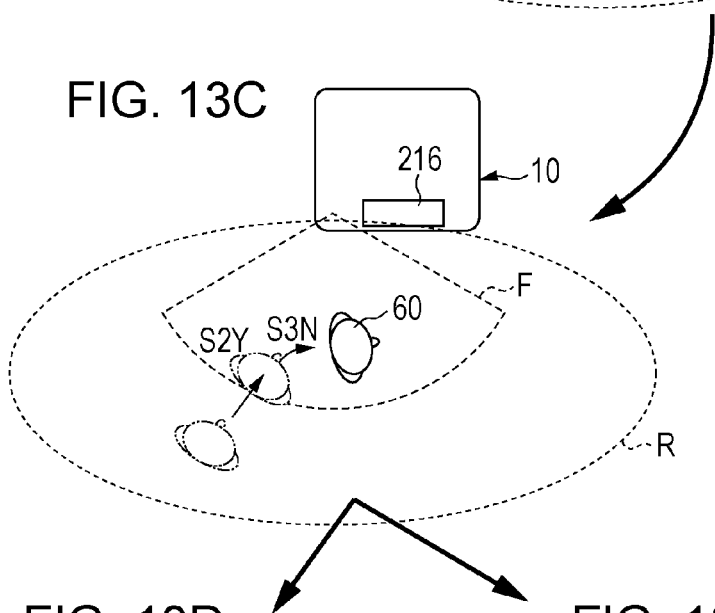
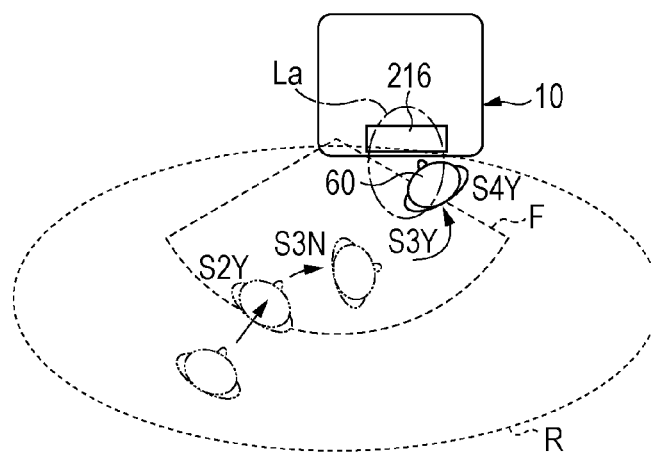
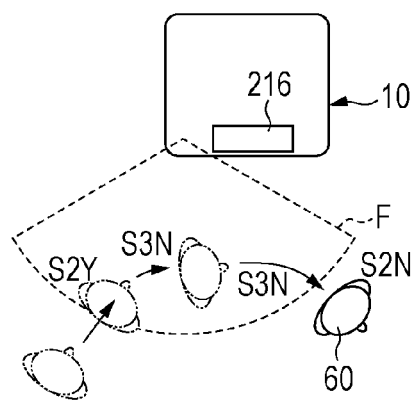

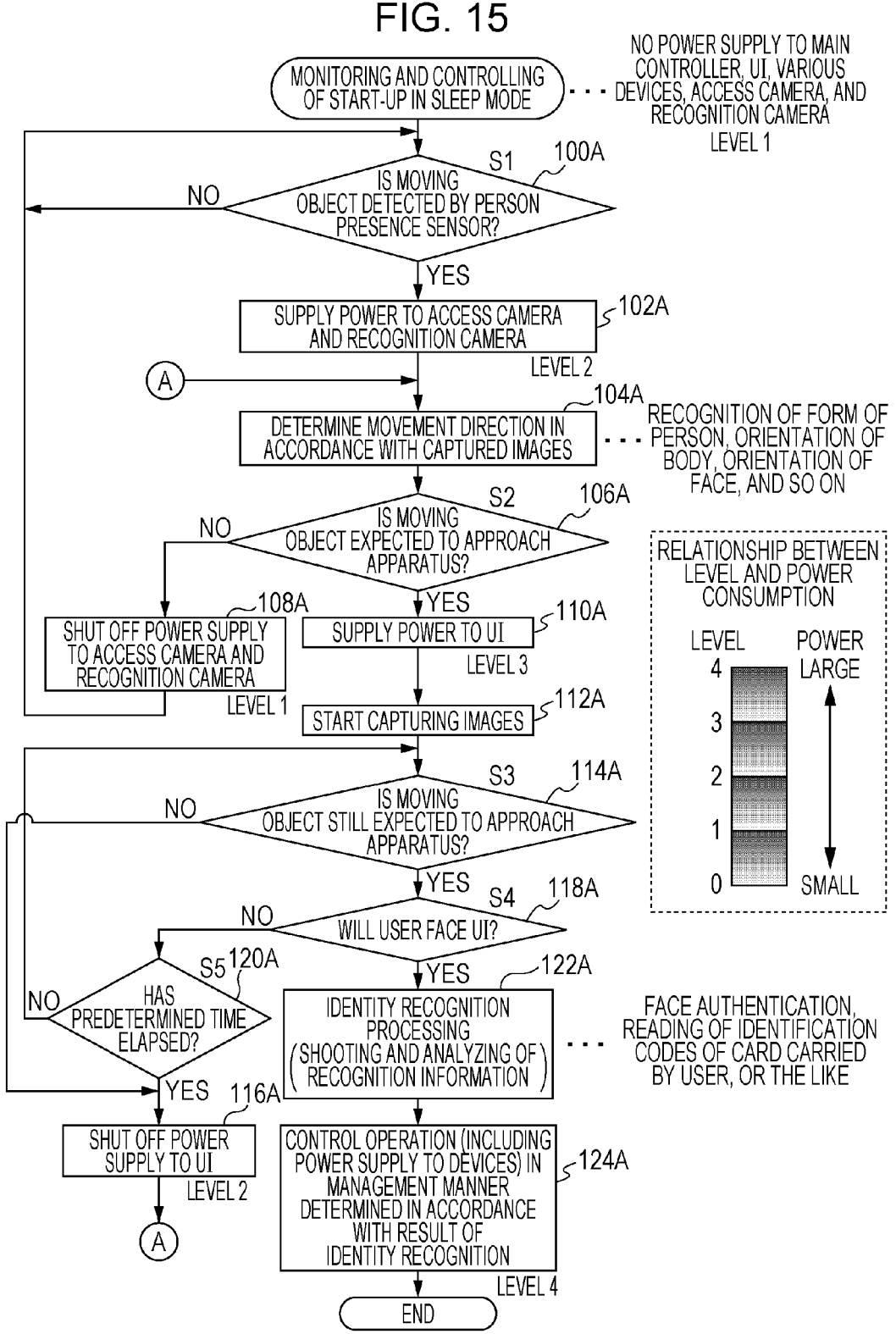

POWER SUPPLY CONTROL APPARATUS, IMAGE PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-214902 filed Oct. 15, 2013.

BACKGROUND (i) Technical Field

The present invention relates to a power supply control apparatus, an image processing apparatus, and a non-transitory computer readable medium.

(ii) Related Art

Person presence sensor control is a way to automate power supply saving control for devices that are power supply targets.

SUMMARY

According to an aspect of the invention, there is provided a power supply control apparatus including a sensor, a first imaging unit, a second imaging unit, and a state controller. The sensor senses a person when the power supply control apparatus is in a power saving state. The first imaging unit consumes higher power than the sensor and captures an image of a person approaching. The second imaging unit captures an image used to recognize a person. The state controller causes the first imaging unit and the second imaging unit to be in a power supply state in a case where the sensor has sensed a person.

BRIEF DESCRIPTION OF THE DRAWINGS

Exemplary embodiments of the present invention will be described in detail based on the following figures, wherein:

FIG. 9 is a plan view of the image processing apparatus according to the first exemplary embodiment, the plan view being used to specify a detection area of a person presence sensor, a detection area of an access camera, and a detection area of a recognition camera;

FIG. 10 is a side view of the image processing apparatus according to the first exemplary embodiment, the side view being used to specify the detection area of the person presence sensor, the detection area of the access camera, and the detection area of the recognition camera;

FIG. 11 is a flowchart illustrating a routine for monitoring and controlling start-up in a sleep mode according to the first exemplary embodiment;

FIGS. 13A to 13E are plan views of the image processing apparatus, the plan views illustrating a second action flow according to the flowchart of FIG. 11;

FIG. 15 is a flowchart illustrating a routine for monitoring and controlling start-up in a sleep mode according to a second exemplary embodiment;

DETAILED DESCRIPTION

First Exemplary Embodiment (Configuration of Image Processing Apparatus)

Figure 1:
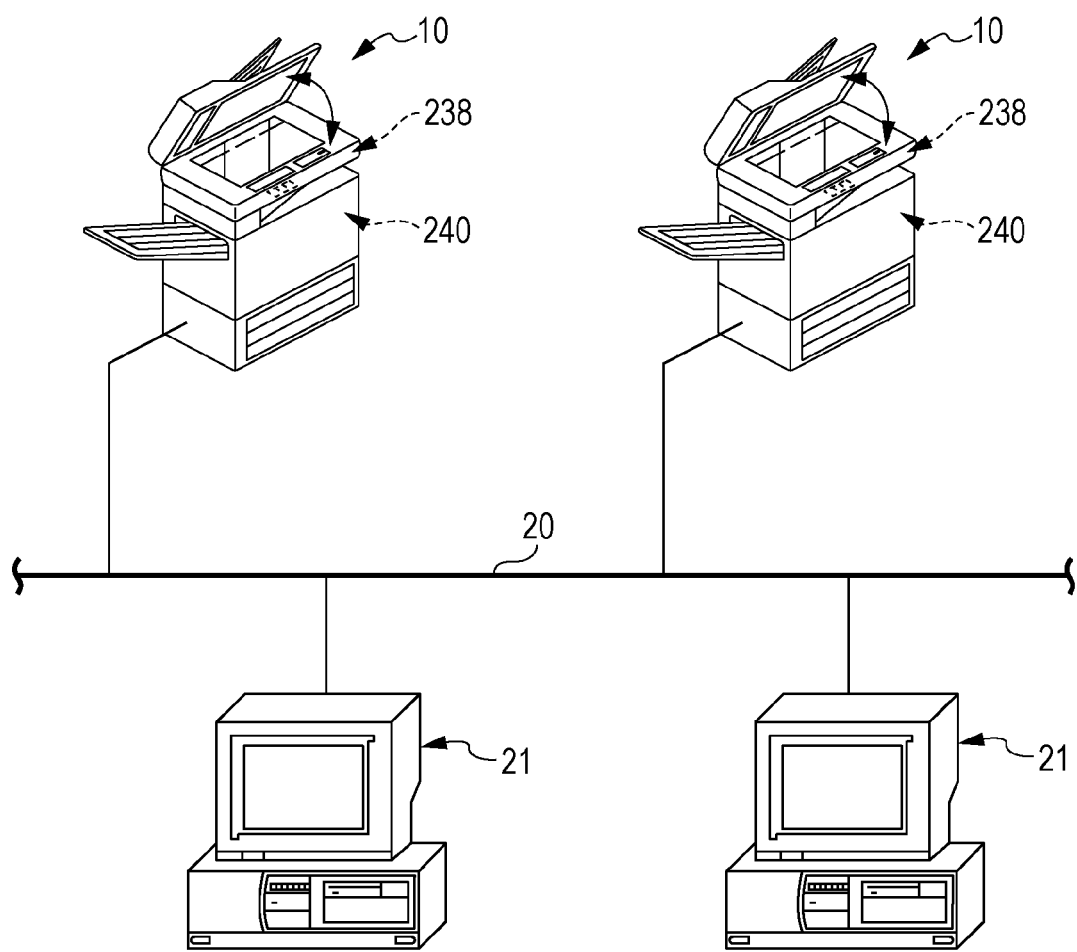
FIG. 1 is a diagram illustrating connection in a communication line network that includes image processing apparatuses according to a first exemplary embodiment.

As illustrated in FIG. 1, an image processing apparatus 10 according to the first exemplary embodiment is connected to a network-communication network 20 such as the Internet. In FIG. 1, two image processing apparatuses 10 are connected to the network-communication network 20; however, the number of image processing apparatuses 10 is not limited thereto, and may be one or be three or more.

Moreover, plural personal computers (PCs) 21 functioning as information terminal devices are connected to the network-communication network 20. In FIG. 1, two PCs 21 are connected to the network-communication network 20; however, the number of PCs 21 is not limited thereto, and may be one or be three or more. Moreover, the information terminal devices are not limited to the PCs 21. Additionally, wired connection does not necessarily need to be used for the network-communication network 20. In other words, the network-communication network 20 may be a communication network in which information is partially or entirely transmitted and received using wireless connection.

As illustrated in FIG. 1, for each of the image processing apparatuses 10, there is a case in which, for example, data is transferred from one of the PCs 21, which is at a remote location, to the image processing apparatus 10 and the image processing apparatus 10 is instructed to perform, for example, an image formation operation (or a print operation) by the PC 21. Alternatively, there is a case in which a user stands in front of one of the image processing apparatuses 10 and instructs the image processing apparatus 10 to perform processing such as copy processing, image reading processing (or scan processing), or fax sending-receiving processing by performing various types of operations.

Figure 2:
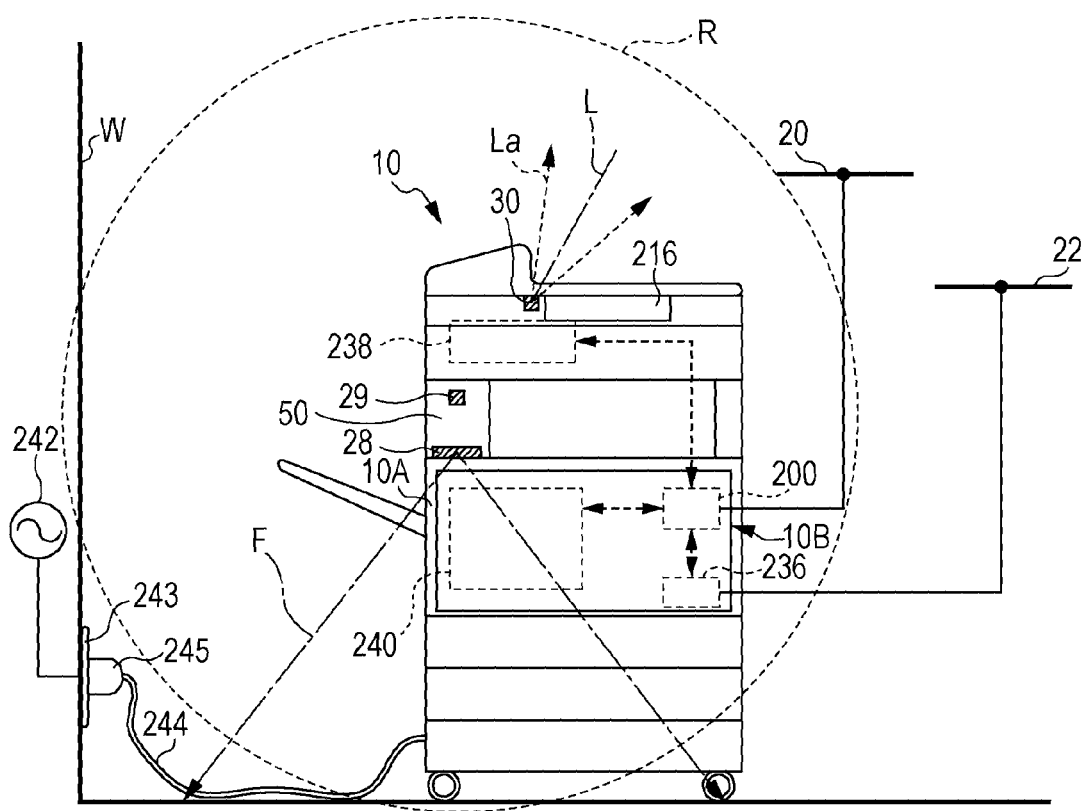
FIG. 2 is a schematic diagram of an image processing apparatus according to the first exemplary embodiment.

FIG. 2 illustrates the image processing apparatus 10 according to the first exemplary embodiment.

The image processing apparatus 10 has a housing 10A provided with doors that may be opened and closed at positions at which the doors are needed. For example, a front door 10B is illustrated in FIG. 2; however, doors may also be provided at right and left sides of the housing 10A. The front door 10B is opened in the case where an operator reaches inside the image processing apparatus 10 and does some work, for example, when a paper jam occurs, consumables are replaced, a periodic check is performed, or the like. The front door 10B is normally closed during operation.

The image processing apparatus 10 includes an image forming unit 240 that forms an image on a piece of recording paper, an image reading unit 238 that reads a document image, and a facsimile communication control circuit 236. The image processing apparatus 10 includes a main controller 200. The main controller 200 temporarily stores image data of a document image read by the image reading unit 238 or transmits the read image data to the image forming unit 240 or to the facsimile communication control circuit 236 by controlling the image forming unit 240, the image reading unit 238, and the facsimile communication control circuit 236.

The main controller 200 is connected to the network-communication network 20 such as the Internet. The facsimile communication control circuit 236 is connected to a telephone network 22. The main controller 200 is connected to a host computer via, for example, the network-communication network 20 and receives image data. The main controller 200 sends and receives a fax via the facsimile communication control circuit 236 through the telephone network 22.

The image reading unit 238 includes a document plate, a scanning drive system, and a photoelectric conversion element. A document is positioned on the document plate. The scanning drive system scans an image formed on the document that is positioned on the document plate and irradiates the image with light. The photoelectric conversion element, such as a charge-coupled device (CCD), receives reflected or transmitted light, which is obtained by scanning the image with the scanning drive system, and converts the reflected or transmitted light into an electric signal.

The image forming unit 240 includes a photoconductor drum. Around the photoconductor drum, a charging device, a scanning exposure section, an image development section, a transfer section, and a cleaning section are provided. The charging device uniformly charges the photoconductor drum. The scanning exposure section scans the photoconductor drum by using a light beam in accordance with image data. The image development section develops an electrostatic latent image that has been formed by scanning the photoconductor drum with the scanning exposure section in such a manner that the photoconductor drum is exposed to the light beam. The transfer section transfers an image that has been developed on the photoconductor drum, onto a piece of recording paper. The cleaning section cleans the surface of the photoconductor drum after transfer is performed by the transfer section. Furthermore, a fixing section that fixes the image which has been transferred onto the piece of recoding paper is provided along a path along which the piece of recording paper is transported.

The image processing apparatus 10 has an input power line 244, and a plug 245 is attached to an end of the input power line 244. The plug 245 is inserted into an outlet 243 provided on a wall surface W and wired into a commercial power source 242, so that the image processing apparatus 10 receives power from the commercial power source 242.

(Hardware Configuration of Control System of Image Processing Apparatus)

Figure 3:
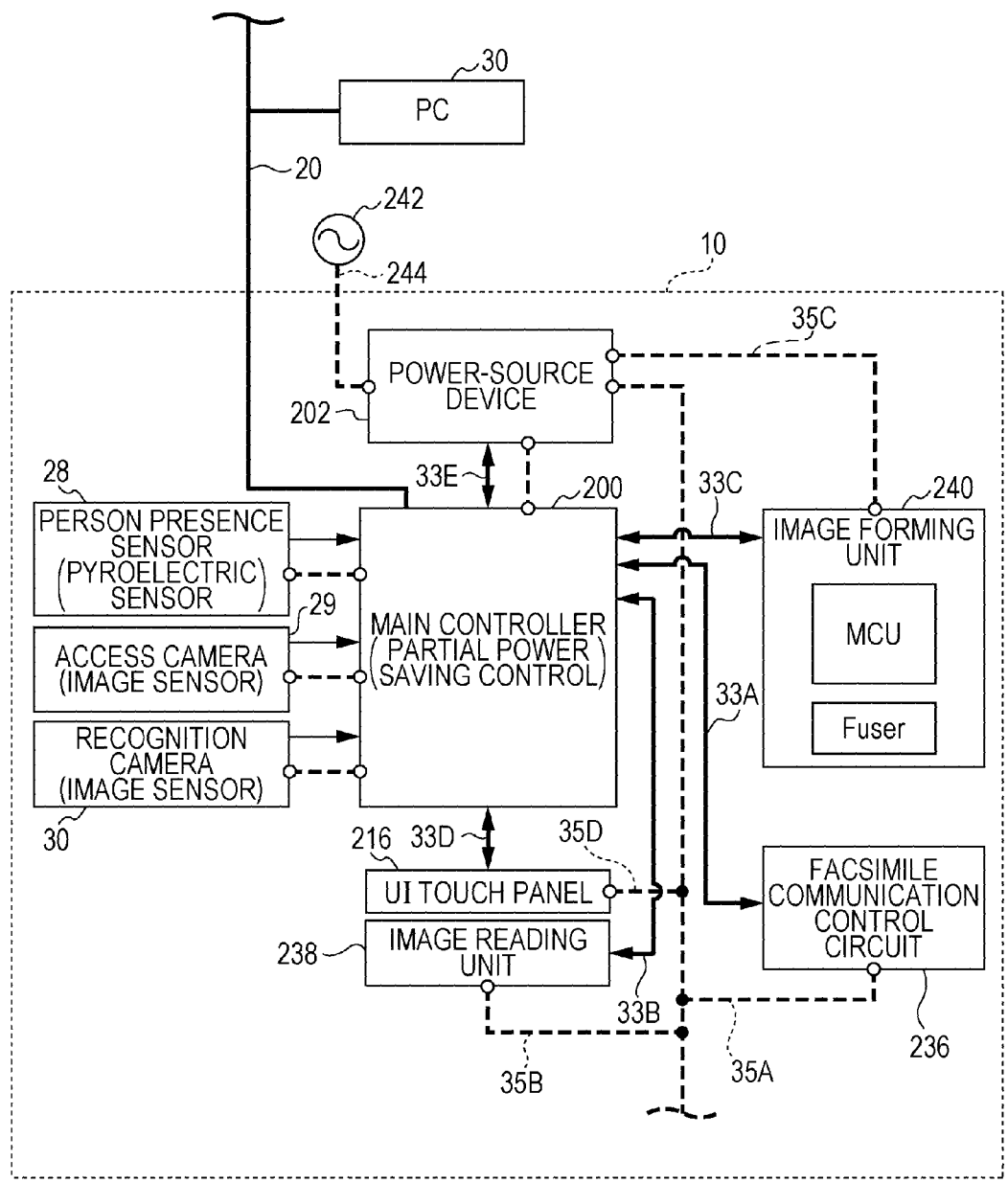
FIG. 3 is a block diagram of the configuration of a control system of the image processing apparatus according to the first exemplary embodiment.

FIG. 3 is a schematic diagram of a hardware configuration of a control system of the image processing apparatus 10.

The main controller 200 is connected to the network-communication network 20. The facsimile communication control circuit 236, the image reading unit 238, the image forming unit 240, and a UI touch panel 216 are connected to the main controller 200 via buses 33A to 33D, respectively, such as data buses and control buses. In other words, the main controller 200 controls the individual processing units of the image processing apparatus 10. Note that a backlight unit 216BL (see FIG. 4) for UI touch panels may be attached to the UI touch panel 216.

Furthermore, the image processing apparatus 10 includes a power-source device 202, and the power-source device 202 is connected to the main controller 200 via a harness 33E. The power-source device 202 receives power from the commercial power source 242. The power-source device 202 supplies power to the main controller 200 (see a dotted line in FIG. 3), and the power-source device 202 is provided with power supply lines 35A to 35D, which are independent of one another. Power is supplied to other devices, which are the facsimile communication control circuit 236, the image reading unit 238, the image forming unit 240, and the UI touch panel 216, through the power supply lines 35A to 35D, respectively. Accordingly, the main controller 200 may control power supply so as to selectively supply power to the individual processing units (devices) (a power-supply mode) or so as to selectively stop supplying power to the individual processing units (devices) (a sleep mode). As a result, what is called partial power saving control may be realized.

Moreover, plural sensors (a first sensor 28, a second sensor 29, and a third sensor 30) are connected to the main controller 200 and monitor whether or not there is a person in the surrounding area of the image processing apparatus 10. The first sensor 28, the second sensor 29, and the third sensor 30 will be described below.

(Functional Block Diagram Mainly Illustrating Partial Power Saving Configuration)

Figure 4:
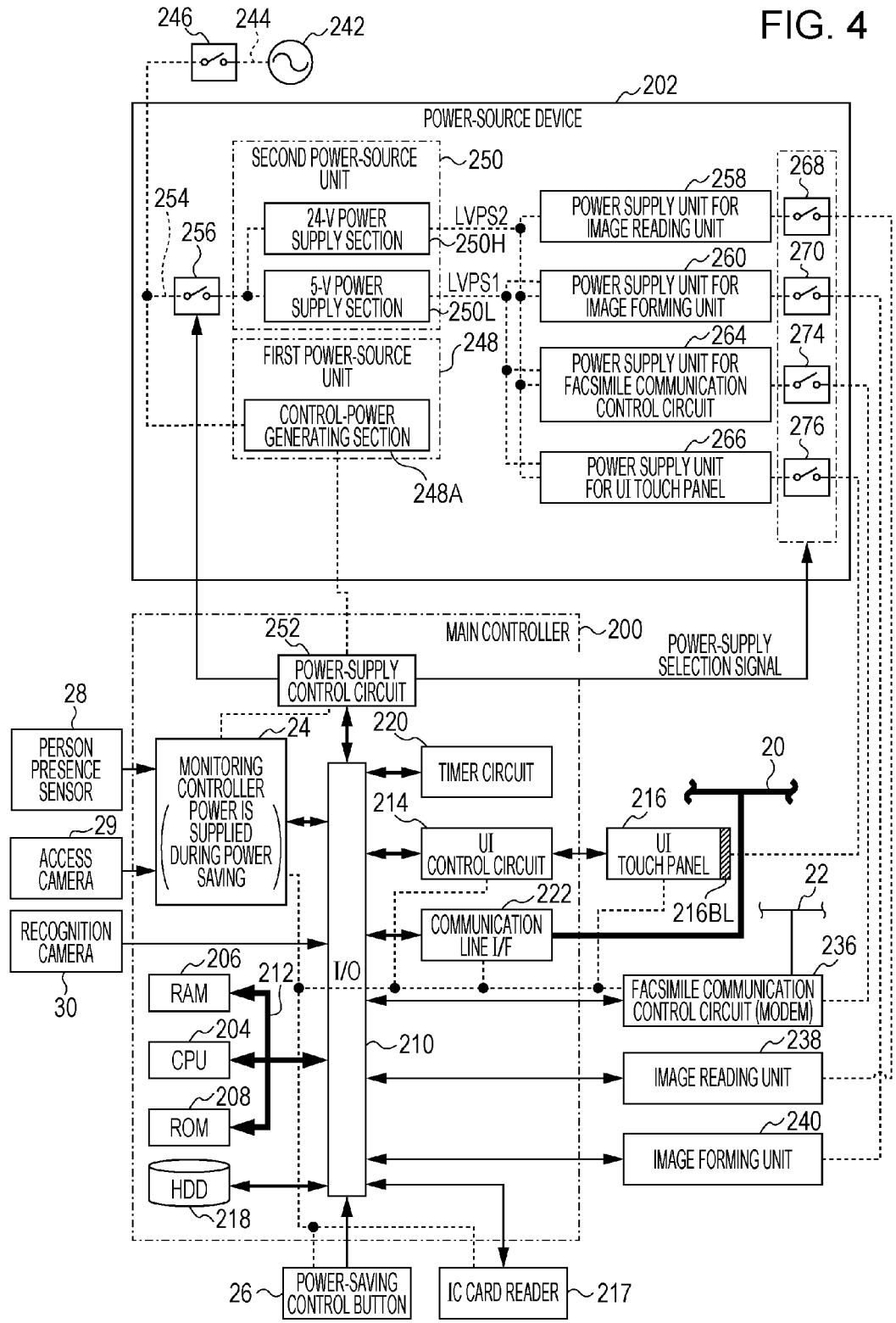
FIG. 4 is a schematic diagram illustrating a functional configuration of a control system that includes a main controller and a power-source device according to the first exemplary embodiment.

FIG. 4 is a schematic diagram of a configuration that mainly illustrates the processing units (which may be referred to as "loads", "devices", "modules", or the like), the main controller 200, and power lines of the power-source device 202. The processing units may be operated by receiving power and are controlled by the main controller 200. Power is supplied to the individual devices through the power lines. In the first exemplary embodiment, power may be selectively supplied or shut off to the individual processing units on a processing-unit-by-processing-unit basis in the image processing apparatus 10 (partial power saving).

Note that partial power saving performed on a processing-unit-by-processing-unit basis is an example. The processing units may be divided into groups, and power saving may be controlled on a group-by-group basis. Alternatively, power saving may be controlled for the entirety of the processing units.

Moreover, partial power saving is also performed for the main controller 200. In the case where power saving is being performed for all the processing units, a monitoring controller 24, which will be described below (see FIG. 4), receives the bare minimum amount of power and no power is supplied to the other devices controlled by the main controller 200. (This state may also be referred to as a "power saving mode" or the "sleep mode".)

[Main Controller 200]

As illustrated in FIG. 4, the main controller 200 includes a central processing unit (CPU) 204, a random-access memory (RAM) 206, a read-only memory (ROM) 208, an input/output (I/O) unit 210, and a bus 212 that includes data busses, control busses, and the like. The CPU 204, the RAM 206, the ROM 208, the I/O unit 210, and the main controller 200 are connected to one another via the bus 212. The UI touch panel 216 (including the backlight unit 216BL) is connected via a UI control circuit 214 to the I/O unit 210. In addition, a hard disk drive (HDD) 218 is connected to the I/O unit 210. The CPU 204 operates in accordance with programs stored on the ROM 208, the HDD 218, or the like, and consequently, the functions of the main controller 200 are realized. Note that the programs may be installed from a recording medium (such as a compact disc (CD), a digital versatile disc (DVD), a Blu-ray Disc (BD), a Universal Serial Bus (USB) memory, and a Secure Digital (SD) memory) on which the programs are stored. The CPU 204 may operate in accordance with the installed programs, and consequently, an image processing function may be realized.

A timer circuit 220, a communication line interface (I/F) 222, the facsimile communication control circuit (modem) 236, the image reading unit 238, and the image forming unit 240 are also connected to the I/O unit 210.

Note that the timer circuit 220 measures elapsed time, which is used to cause the facsimile communication control circuit 236, the image reading unit 238, and the image forming unit 240 to be in a power saving state (a power-supply shutoff state). (Hereinafter, the timer circuit 220 may also be referred to as a "system timer".)

Power is supplied from the power-source device 202 to the main controller 200 and the individual devices (the facsimile communication control circuit 236, the image reading unit 238, and the image forming unit 240) (see dotted lines in FIG. 4). Note that, in FIG. 4, each power line is represented by a single line (dotted line); however, in the case where the polarity and the like are controlled by the power-source device 202, in reality, the power line often physically contains two or three lines.

[Power-Source Device 202]

As illustrated in FIG. 4, the input power line 244, which is routed from the commercial power source 242, is connected to a main switch 246. When the main switch 246 is turned on, power may be supplied to a first power-source unit 248 and a second power-source unit 250.

The first power-source unit 248 includes a control-power generating section 248A, and is connected to a power-supply control circuit 252 of the main controller 200. The power-supply control circuit 252 receives power for the main controller 200 and is connected to the I/O unit 210. The power-supply control circuit 252 performs, in accordance with a control program for the main controller 200, switching control for supplying or shutting off power through the power supply lines at least to the individual devices (the facsimile communication control circuit 236, the image reading unit 238, and the image forming unit 240).

In contrast, a power line 254 connected to the second power-source unit 250 is provided with a first sub-power-source switch 256 (hereinafter may also be referred to as a "SW-1"). The SW-1 is controlled to be On or Off by the power-supply control circuit 252. That is, when the SW-1 is Off, the second power-source unit 250 does not work. (The individual units downstream of the "SW-1" are in the state of zero power consumption).

The second power-source unit 250 includes a 24-V power supply section 250H (LVPS2) and a 5-V power supply section 250L (LVPS1). The 24-V power supply section 250H (LVPS2) is a power source that is mainly used, for example, for motors.

The 24-V power supply section 250H (LVPS2) of the second power-source unit 250 is connected to a power supply unit 258 for the image reading unit 238, a power supply unit 260 for the image forming unit 240, a power supply unit 264 for the facsimile communication control circuit 236, and a power supply unit 266 for the UI touch panel 216. The 5-V power supply section 250L (LVPS1) of the second power-source unit 250 is connected to the power supply unit 260 for the image forming unit 240, the power supply unit 264 for the facsimile communication control circuit 236, and the power supply unit 266 for the UI touch panel 216.

The power supply unit 258 for the image reading unit 238 uses the 24-V power supply section 250H (LVPS2) as an input source, and is connected to the image reading unit 238 via a second sub-power-source switch 268 (hereinafter may be referred to as a "SW-2").

The power supply unit 260 for the image forming unit 240 uses the 24-V power supply section 250H (LVPS2) and the 5-V power supply section 250L (LVPS1) as input sources, and is connected to the image forming unit 240 via a third sub-power-source switch 270 (hereinafter may be referred to as a "SW-3").

The power supply unit 264 for the facsimile communication control circuit 236 uses the 24-V power supply section 250H (LVPS2) and the 5-V power supply section 250L (LVPS1) as input sources, and is connected to the facsimile communication control circuit 236 via a fifth sub-power-source switch 274 (hereinafter may be referred to as a "SW-5").

The power supply unit 266 for the UI touch panel 216 uses the 5-V power supply section 250L (LVPS1) and the 24-V power supply section 250H (LVPS2) as input sources, and is connected to the UI touch panel 216 (including the backlight unit 216BL) via a sixth sub-power-source switch 276 (hereinafter may be referred to as a "SW-6"). Note that power may also be supplied for fundamental functions of the UI touch panel 216 (the fundamental functions excluding functions regarding the backlight unit 216BL) from the monitoring controller 24.

As in the case of the first sub-power-source switch 256, each of the second sub-power-source switch 268, the third sub-power-source switch 270, the fifth sub-power-source switch 274, and the sixth sub-power-source switch 276 is controlled to be On or Off in accordance with a power-supply selection signal supplied from the power-supply control circuit 252 of the main controller 200. Although not illustrated, switches and wiring lines that are used to supply power from the 24-V power supply section 250H and the 5-V power supply section 250L form two channels. Furthermore, each of the second sub-power-source switch 268, the third sub-power-source switch 270, the fifth sub-power-source switch 274, and the sixth sub-power-source switch 276 may be arranged in a corresponding one of the individual devices to which power is to be supplied, instead of being arranged in the power-source device 202. Power supplied from the commercial power source 242 (for example, 100 V) is directly supplied from the downstream side of the first sub-power-source switch 256 ("SW-1") to the fixing section, which is not illustrated in FIG. 4 and corresponds to a "Fuser" illustrated in FIG. 3, of the image forming unit 240. The fixing section is electrically connected only when the image forming unit 240 needs the fixing section.

(Monitoring Control for Changing State of Image Processing Apparatus)

Here, in some cases, the main controller 200 in the first exemplary embodiment may partially stop the functions thereof (partial power saving) in order to realize minimum power consumption. In some cases, power supply is shut off to the greater part of the main controller 200 in addition to processing units. Such cases are collectively referred to as the "sleep mode" (the power saving mode).

The image processing apparatus 10 may enter the sleep mode, for example, by activating the system timer at a point in time when image processing finishes. In other words, power supply is stopped after a predetermined time has elapsed since activation of the system timer. Note that, when a certain operation is performed (for example, a hard key is operated) before the predetermined time elapses, as a matter of course, measurement of the predetermined time with the system timer for entering the sleep mode is stopped, and the system timer is activated at a point in time when the next image processing finishes.

In contrast, the monitoring controller 24 (see FIG. 4) is an element that constantly receives power even when the image processing apparatus 10 is in the sleep mode. The monitoring controller 24 is connected to the I/O unit 210. The monitoring controller 24 may include, for example, an integrated circuit (IC) chip, which is referred to as an application-specific integrated circuit (ASIC), in which an operation program is stored, and which includes a CPU, a RAM, a ROM, and so forth by which the operation program is performed.

When monitoring is being performed while the image processing apparatus 10 is in the sleep mode, for example, a print request may be received via a communication-line detector or a facsimile (FAX) reception request may be received via a FAX line detector. In such a case, the monitoring controller 24 causes power to be supplied to the devices for which power saving is being performed, by controlling the first sub-power-source switch 256, the second sub-power-source switch 268, the third sub-power-source switch 270, the fifth sub-power-source switch 274, and the sixth sub-power-source switch 276 via the power-supply control circuit 252.

A power-saving control button 26 is connected to the I/O unit 210 of the main controller 200. Power saving mode may be cancelled if a user operates the power-saving control button 26 while power saving is being performed. Note that the power-saving control button 26 may also have a function of forcibly shutting off power supply to processing units and causing the processing units to be in the power-saving state when the power-saving control button 26 is operated while power is being supplied to the processing units.

Here, it is desirable that the bare minimum amount of power for operation be supplied to the power-saving control button 26 and individual detectors in addition to the monitoring controller 24 while power saving is being performed, in order to perform monitoring while the image processing apparatus 10 is in the sleep mode. In other words, even when the image processing apparatus 10 is in the sleep mode, which is a non-power-supply state, the power-saving control button 26 and the individual detectors in addition to the monitoring controller 24 may receive power whose amount is equal to or lower than a predetermined value (for example, 0.5 W or lower) and that is necessary to perform determination control as to whether or not power is to be supplied.

In this case, the power supply source is not limited to the commercial power source 242, and may be a storage battery, a solar battery, a rechargeable battery that is recharged when power is supplied from the commercial power source 242, or the like. The commercial power consumption (or power expenses) while the image processing apparatus 10 is in the sleep mode may be zero by using no commercial power source 242.

Note that, in a specific time period while the image processing apparatus 10 is in the sleep mode, the bare minimum amount of power for operation may be mainly supplied to an input system such as the UI touch panel 216 and an IC card reader 217. In this case, it is desirable that the backlight unit 216BL be turned off or the illumination thereof be reduced to be lower than in a normal mode.

(Application of Sensor)

In a case where a user who stands in front of the image processing apparatus 10 operates the power-saving control button 26 during the sleep mode and power supply is restarted, there may be a case where a certain period of time is required for start-up of the image processing apparatus 10.

In the first exemplary embodiment, a person presence sensor may be applied as the first sensor 28 because the first sensor 28 senses movement of moving objects including a user. Hereinafter, the first sensor 28 is referred to as a "person presence sensor 28".

The term person presence sensor 28 contains the words "person presence". This is a proper noun in the first exemplary embodiment, and it is desirable that the person presence sensor 28 be capable of sensing, which is synonymous with detecting, at least persons. In other words, the person presence sensor 28 may also sense moving objects other than a person. Thus, in the following, there may be a case where what the person presence sensor 28 detects is referred to as a person; however, animals, robots, and the like that execute a requested order instead of a person will be future detection targets. Note that, in contrast, if there are special sensors that are capable of detecting and identifying a person, such a special sensor may be applied as the person presence sensor 28. In the following, a moving object, a person, a user, and the like are considered to be the same in terms of a detection target, which is to be detected by the person presence sensor 28, and are considered to be different from one another as necessary.

According to the specifications of the person presence sensor 28 according to the first exemplary embodiment, the first sensor 28 detects movement of a moving object in the surrounding area of the image processing apparatus 10. In this case, a representative example of the person presence sensor 28 is an infrared radiation sensor (a pyroelectric type sensor) using a pyroelectric effect of a pyroelectric element. In the first exemplary embodiment, a pyroelectric type sensor is applied as the person presence sensor 28.

The greatest feature of a sensor using a pyroelectric effect of a pyroelectric element, the sensor being applied as the person presence sensor 28, is that power consumption is lower and a detection area is broader than, for example, those of a reflex sensor provided with a projection section and a reception section. Since the person presence sensor 28 detects movement of a moving object, the person presence sensor 28 does not detect presence of a person when the person stays still even though the person is in the detection area. For example, there is a case where a high-level signal is output when a person is moving. When the person stays still in the detection area, the high-level signal becomes a low-level signal.

Note that "still" in the first exemplary embodiment includes not only a notion of absolute standstill as in still images taken by still cameras or the like but also a case where, for example, a person stops in front of the image processing apparatus 10 so as to perform operation. Thus, "still" in the first exemplary embodiment also includes a case where a person moves slightly (for example, due to breathing) within a predetermined range and a case where a person moves arms, legs, the neck, or the like within a predetermined range.

Note that, when a person performs stretching exercise or the like in front of the image processing apparatus 10 while the person is waiting for, for example, the completion of image forming processing, image reading processing, or the like, the person presence sensor 28 may detect the presence of the person.

Thus, the sensitivity of the person presence sensor 28 does not have to be adjusted by defining what is considered to be "still", and may be adjusted relatively roughly and in a standard manner so as to depend on the sensitivity characteristics of the person presence sensor 28. That is, when the person presence sensor 28 outputs one of binary signals (for example, a high-level signal), this means that a person is present in the detection area and the person is moving. When the other one of the binary signals (for example, a low-level signal) is output, this means "still".

In the first exemplary embodiment, when the person presence sensor 28 detects the moving object, power supply to the second sensor 29 is started. The second sensor 29 is connected to the monitoring controller 24. The second sensor 29 is in the power-supply shutoff state while the image processing apparatus 10 is in the sleep mode; however, power is supplied thereto when the person presence sensor 28 detects a moving object.

In the first exemplary embodiment, a sensor with a camera function for detecting movement information on a moving object (a user) (including distance information regarding how far or near the moving object is and movement direction information) is applied as the second sensor 29. Hereinafter, the second sensor 29 is referred to as an "access camera 29".

The access camera 29 captures images with which at least the transition of the position of the moving object may be recognized. Note that, when the position of a moving object is detected, if the moving object emits a signal, a radar unit may be applied as the access camera 29; however, description will be made on the assumption that the moving object in the first exemplary embodiment emits no signal.

In the first exemplary embodiment, when it is determined, by using the access camera 29, that the moving object is approaching the image processing apparatus 10, especially the UI touch panel 216, for example, shifting from the sleep mode to a specific mode (in which power is supplied to the main controller 200, the UI touch panel 216, and the third sensor 30) is triggered. Note that the backlight unit 216BL, which is turned off when the user is approaching, may be turned on when the user is facing the UI touch panel 216.

Moreover, "confirmation" that a user is approaching the UI touch panel 216 is performed also when it is "predicted" that the user is approaching the UI touch panel 216. Thus, such a "confirmation" is made also in the case where the user makes a U-turn and does not face the UI touch panel 216 in the end.

In the first exemplary embodiment, in the case where the access camera 29 detects that the moving object is approaching and it is predicted that the moving object will soon face the UI touch panel 216, power supply to the third sensor 30 is started. The third sensor 30 is connected to the I/O unit 210 of the main controller 200.

In the first exemplary embodiment, a sensor with a camera function that is used to detect identity recognition information of a user is applied as the third sensor 30. Hereinafter, the third sensor 30 is referred to as a "recognition camera 30".

The recognition camera 30 detects identity recognition information of a user. For example, the recognition camera 30 captures an image of a characteristic part of the user such as the face or the like. The main controller 200 performs verification and analysis in accordance with information of the characteristics of the image of a face or the like captured by the recognition camera 30, by using an image database regarding the characteristics of faces that have been stored in advance on the ROM 208 or the HDD 218. As a result, for example, identity authentication is performed for the user or a personalized screen for the user is automatically displayed on an operation panel by linking information of the characteristics of the user to the personalized screen.

That is, a moving object that is approaching the image processing apparatus 10 is detected through the function of the access camera 29, and the identity of the moving object is authenticated through the function of the recognition camera 30 in the first exemplary embodiment. However, a moving object that is approaching the image processing apparatus 10 may be detected and the identity of the moving object may be authenticated through the function of the access camera 29, and a UI screen appropriate for the authenticated moving object may be selected or the like and a user-friendly and simpler operation procedure may be realized through the function of the recognition camera 30.

The identity recognition information is used to determine whether or not the user has the right to access the image processing apparatus 10, to determine which types of device or the like are to be used, and to control the operation of the image processing apparatus 10.

For example, the identification information of the user, which is the identity recognition information, is registered in advance together with a corresponding job type from the PC 21 on the desk of the user. After an image of a face or the like of the user is captured, the corresponding job type may be specified by executing authentication processing in accordance with information of the image of a face and by verifying the identification information obtained from the information of the image of the face against the identification information that has been registered together with the corresponding job type.

Note that what is captured by the recognition camera 30 is not limited to the image of a face of a user 60. An image of bar codes or Quick Response (QR) Code (registered trademark) of an item (an ID card or documents) that the user 60 has or carries may be captured and used to perform verification.

(Arrangement Configuration of Person Presence Sensor 28, Access Camera 29, and Recognition Camera 30)

As illustrated in FIG. 2, the person presence sensor 28 and the access camera 29 are provided on a pillar unit 50 on the housing 10A of the image processing apparatus 10. The pillar unit 50 has a vertically elongated rectangular shape. Moreover, the recognition camera 30 is provided near the UI touch panel 216.

Figure 5:
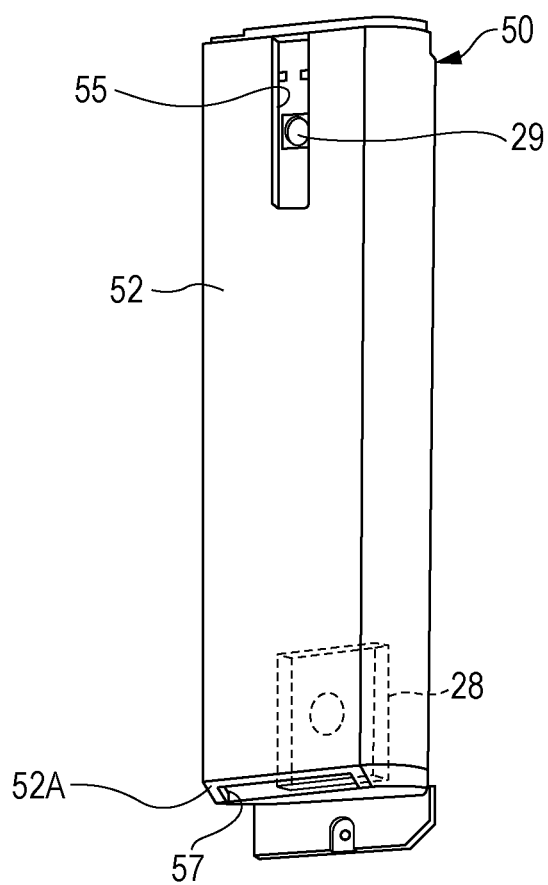
FIG. 5 is a perspective view of a covering member provided on the front surface of a pillar unit according to the first exemplary embodiment.

The pillar unit 50 is provided so as to connect an upper housing that mainly covers the image reading unit 238 and a lower housing that covers mainly the image forming unit 240. The pillar unit 50 has a column shape. In the pillar unit 50, a recording paper transport system and the like, not illustrated, are installed. FIG. 5 is an enlarged view of the pillar unit 50.

As illustrated in FIG. 5, the pillar unit 50 has a cover member 52 on the front surface thereof. The cover member 52 covers the pillar unit 50 as an aesthetic element and has a vertically elongated rectangular shape.

As illustrated in FIG. 5, the top end portion of the cover member 52 has a slit opening 55, which is vertically long. The access camera 29 is provided at the back side of the slit opening 55. Although not illustrated, a concealing member whose transmittance is relatively low (whose transmittance is 50% or lower) is placed in the slit opening 55. This concealing member conceals the access camera 29, and consequently, it is harder to see the access camera 29 from the outside. This concealing member is provided as an aesthetic element, and the detection function of the access camera 29 is basically maintained.

There is a space between the bottom surface of the cover member 52 and the top surface of the lower housing. The bottom end portion of the cover member 52 is chamfered and has what is called a chamfered shape, which is a chamfered surface 52A. A through hole 57 is provided on the chamfered surface 52A.

The person presence sensor 28 is provided on the side behind the through hole 57 (at the back side of the cover member 52). Thus, the through hole 57 functions as a monitor window through which the person presence sensor 28 detects a moving object.

Figure 6:
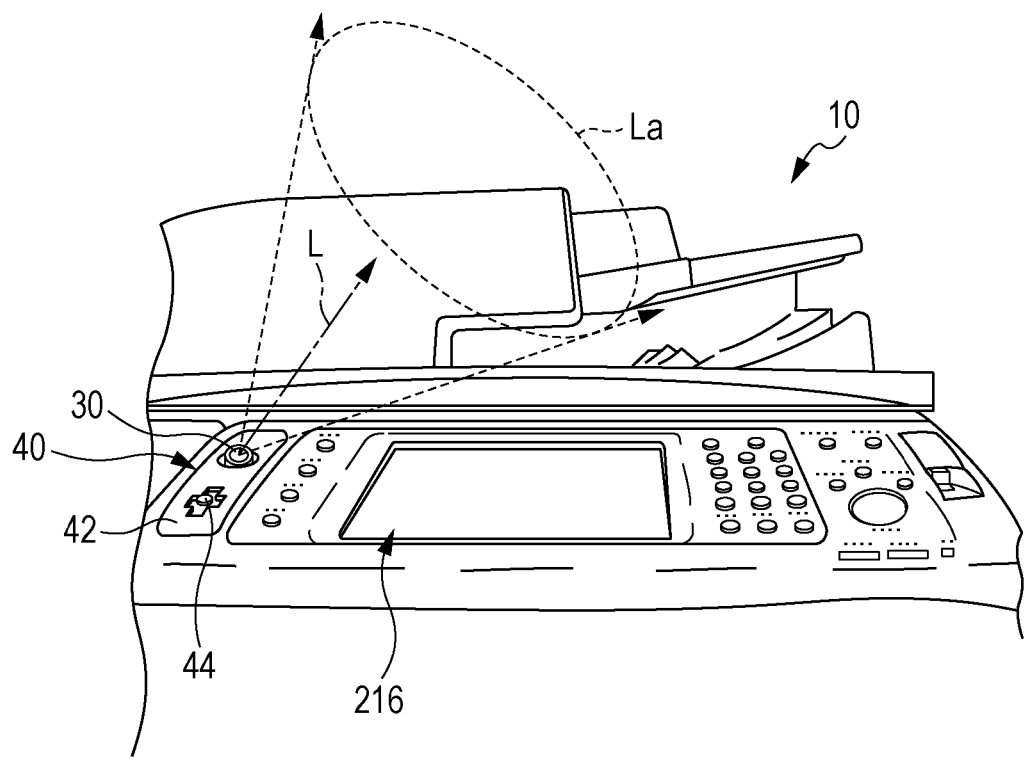
FIG. 6 is an external view illustrating a user interface (UI) touch panel according to the first exemplary embodiment.

As illustrated in FIG. 6, a recognition camera unit 40 is provided at a position next to and to the left of the UI touch panel 216 in the image processing apparatus 10.

In the recognition camera unit 40, a lens of the recognition camera 30 is exposed at the surface of a base unit 42. The lens is provided at a position from which an image is optically formed on an image pickup device (not illustrated) provided under the base unit 42.

An adjustment unit 44 is provided under (the lens of) the recognition camera 30 in the base unit 42. The adjustment unit 44 has, for example, the shape of a directional pad. The optical axis of the lens of the recognition camera 30 may be mechanically adjusted vertically and horizontally by performing a vertical or horizontal operation using the adjustment unit 44. Note that the adjustment unit 44 is not always necessary and an image capturing area may be fixed.

Figure 7:
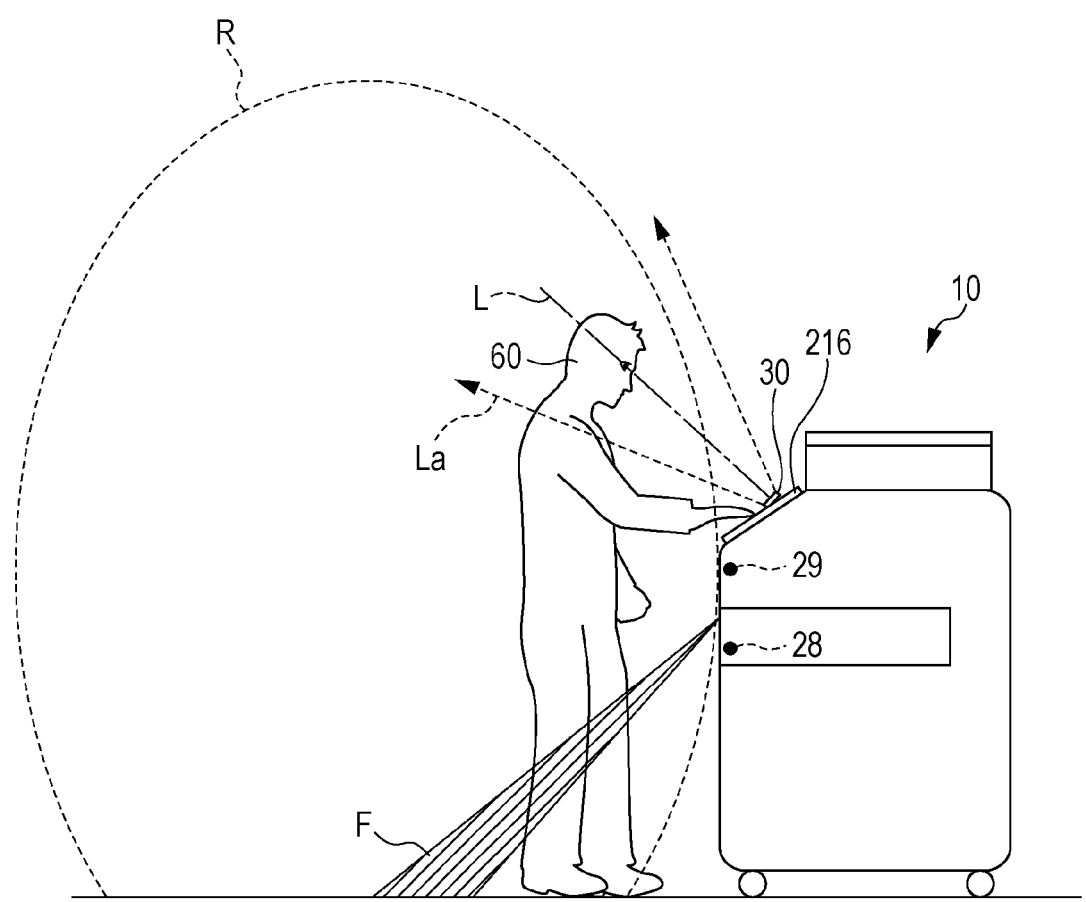
FIG. 7 is a diagram illustrating a side view of the image processing apparatus according to the first exemplary embodiment and a case where a user is facing the UI touch panel.

As illustrated in FIG. 7, the optical axis of the recognition camera 30 is adjusted by using the adjustment unit 44 or is adjusted to be at a fixed standard position before shipment of the recognition camera 30 in such a manner that an image of a face of a user who will soon face or is facing the UI touch panel 216 of the image processing apparatus 10 may be captured.

Moreover, an image capturing timing of the recognition camera 30 is controlled so as to cooperate with the person presence sensor 28 and the access camera 29. That is, power supply to the recognition camera 30 is shut off at least while the image processing apparatus 10 is in the sleep mode. Here, in the case where a moving object is detected by the person presence sensor 28 and it is predicted by using the access camera 29 that the user 60 will soon face the UI touch panel 216 while the image processing apparatus 10 is in the sleep mode, power is supplied to the recognition camera 30 and capturing of specific images is started.

By analyzing a specific image captured by the recognition camera 30, it is determined whether or not the user 60 will soon face the UI touch panel 216. The specific image is analyzed to perform face recognition for the user 60. The main controller 200 performs identity recognition for the user 60 who will soon face the UI touch panel 216 by using the recognition camera 30. In the case where the user 60 is identified, control of power supply to the individual devices of the image processing apparatus 10 is executed.

In contrast, for example, in the case where it is not confirmed that the user 60 will soon face the UI touch panel 216, power supply to the recognition camera 30 may be shut off in accordance with a time period during which it is not confirmed that the user 60 will soon face the UI touch panel 216.

The access camera 29 and the recognition camera 30 detect, in the surrounding area of the image processing apparatus 10, presence or absence of a moving object, the shape (outline) of the moving object, information on movement of the moving object in time series, and the like. For example, an image sensor (a charge-coupled device (CCD) image sensor or a complementary metal-oxide-semiconductor (CMOS) image sensor) may be applied as the access camera 29 and the recognition camera 30.

Image sensors are general sensors applied as an imaging unit that captures a moving image, and thus detailed description thereof will be omitted here. Briefly, an image sensor has a configuration as described below.

An image sensor is made mainly from a semiconductor device using a silicon monocrystal. The number of free electrons (or signal charges) that are generated due to the photoelectric effect is measured and the amount of light that has hit the image sensor is recognized. As a system that holds the generated signal charges, a photodiode is mainly used.

When a color image sensor is used, differences in brightness may be obtained from the amount of the signal charges from the photodiode but differences between colors are not obtained from the amount of the signal charges from the photodiode. Thus, pixels are equipped with color filters, and the color filter of each pixel passes light having a specific color corresponding to the color filter.

For example, color filters are arranged in a Bayer pattern for pixels in an image sensor for digital cameras. The three primary colors are red, green, and blue. Red, green, and blue filters are used as the color filters. The number of green filters used is twice the number of the red or blue filters. This is because the human eye is more sensitive to green light than to light of the other colors. (We perceive green light to be brightest even when red, blue, and green light have the same energy.) This makes the resolution of the captured image higher.

In contrast, image sensors (a CCD camera or the like) applied as the access camera 29 and the recognition camera 30 in the first exemplary embodiment do not have to be adjusted in accordance with the sensitivity of the human eye. In other words, in the case where an image sensor is applied as the access camera 29, the arrangement of color filters is determined in accordance with what is analyzed on the basis of an output signal supplied from the access camera 29 and the image sensor is adjusted in accordance with the specifications of the access camera 29. The same applies to the case where an image sensor is applied as the recognition camera 30.

As the specifications of the access camera 29, it is desirable that the resolution of the access camera 29 be at a level at which the course of a moving object that is approaching the image processing apparatus 10 is understandable and the field of view (the image capturing area) of the access camera 29 needs to be broader (or especially has a wider angle) than that of the person presence sensor 28.

For example, the person presence sensor 28 has a detection area F that is fixed at an angle inclined downward (in the direction toward the floor surface on which the image processing apparatus 10 is installed) and has an angle of view set to about 100° to 120°. The reason that the detection area F is fixed at an angle inclined downward (in a downward direction) is to limit the detection distance and to avoid unnecessary start-up (power supply) while the image processing apparatus 10 is in the sleep mode. The reason that the angle of view is set to about 100° to 120° is to avoid detection of a moving object that passes in the surrounding area of the image processing apparatus 10.

In contrast, by limiting the detection area F, there is a case in which the positions of all the users who operate the image processing apparatus 10 near the image processing apparatus 10 are not detected, after power is supplied. For example, a user who operates at a finisher portion positioned at an end of the image processing apparatus 10 in the lateral direction is outside the detection area F of the person presence sensor 28, and the image processing apparatus 10 may enter the sleep mode while the user is operating the image processing apparatus 10. Thus, a dead-angle area of the person presence sensor 28 is compensated by utilizing the access camera 29.

As the specifications of the recognition camera 30, for example, face recognition may be performed for a user who will soon face the image processing apparatus 10, instead of performing IC card authentication, which is an identity recognition function. In the case where the image of a face captured by the recognition camera 30 is recognized through verification performed by using a face image database, power is supplied to necessary devices, which may be all the devices. The face recognition is performed using a filter structure (a filter structure with which mainly the outline of the face, the eyes, the nose, the mouth, and the like are clearly detected).

In the first exemplary embodiment, information output from the recognition camera 30 is analyzed mainly for face identification; however, a filter structure that makes it possible to detect an ID card that has been recently steadily carried by a user (for example, an ID card worn around the neck of a user, an ID card clipped to a user's breast pocket, or the like) or a filter structure that makes reading of bar codes on an ID card easier may be used.

In addition, as another example, in the case where devices that are needed to start up are determined in accordance with the type of document that a user approaching the image processing apparatus 10 has, a filter structure that makes determination of the type of document easier may be used. For example, in the case where the format of a fax cover sheet is recognized, the following may be performed: devices that are necessary for fax transmission start up, the display content on the UI touch panel 216 is determined by identifying whether the document is black and white or color, and the like.

FIGS. 7 to 10 illustrate an example of comparison between the detection area F of the person presence sensor 28, a detection area R of the access camera 29, and a detection area La of the recognition camera 30.

Figure 8:
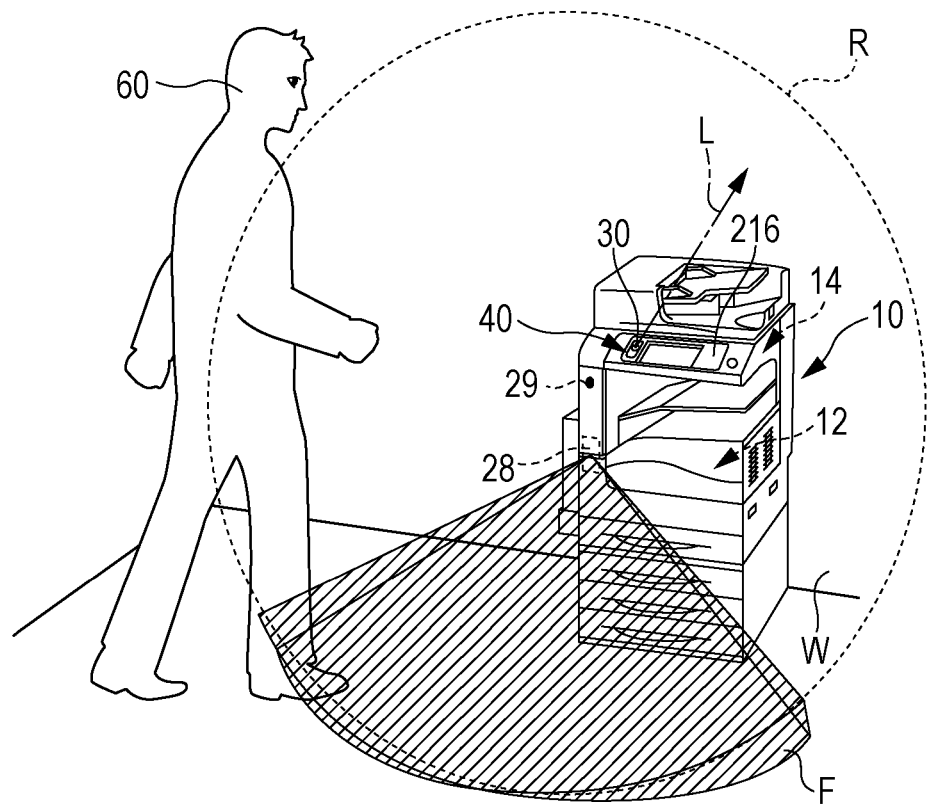
FIG. 8 is a perspective view illustrating a state in which a user is approaching the image processing apparatus according to the first exemplary embodiment.

The detection area F in FIG. 8, which is a hatched area, is the detection area for the person presence sensor 28. As described above, the detection area F of the person presence sensor 28 has a wide angle of about 100° to 120° and faces toward the floor surface on which the image processing apparatus 10 is installed.

In contrast, an area defined by a dotted line in FIG. 8 is the detection area R of the access camera 29. It is clear that the detection area R of the access camera 29 covers an area that the detection area F of the person presence sensor 28 does not cover.

The area represented by arrows La drawn with a dotted line, the center line of the area being the optical axis L, in FIG. 7 is the detection area La (an image capturing area) of the recognition camera 30. The recognition camera 30 captures an image of a face of the user 60 in the case where the user 60 will soon face or is facing the UI touch panel 216.

In the following, an operation according to the first exemplary embodiment will be described.

The operation state of the image processing apparatus 10 shifts to the sleep mode when no processing is being performed. In the first exemplary embodiment, power is supplied only to the monitoring controller 24.

Here, when start-up is triggered (when it is predicted that a user is approaching the image processing apparatus 10 by using the access camera 29, when an operation for canceling the power saving mode is performed, or when an input operation (for example, a key input operation) is performed on the UI touch panel 216 or the like), the main controller 200, the UI touch panel 216, and the recognition camera 30 start up. For example, in the case where a user who has been authenticated through face recognition and may access the image processing apparatus 10 inputs a job (by using keys) from the UI touch panel 216 or the like, the image processing apparatus 10 enters a warm-up mode in accordance with the type of job.

When a warm-up operation ends in the warm-up mode, the image processing apparatus 10 enters a standby mode or a running mode.

In the standby mode, the image processing apparatus 10 is literally in a mode in which the image processing apparatus 10 is ready for operation. The image processing apparatus 10 is in a state in which the image processing apparatus 10 may perform operation for image processing at any time.

Thus, a job execution operation is commanded through a key input operation, the operation state of the image processing apparatus 10 shifts to the running mode and image processing according to the commanded job is executed.

When the image processing ends (or when all sequential jobs end in the case where sequential and plural jobs are waiting in a queue), this triggers standby and the operation state of the image processing apparatus 10 shifts to the standby mode.

When a job is commanded to be executed while the image processing apparatus 10 is in the standby mode, the operation state of the image processing apparatus 10 shifts to the running mode again. In contrast, for example, in the case where it is detected that the user is away from the image processing apparatus 10 (or it is predicted that the user will soon be away from the image processing apparatus 10) by using the access camera 29 or in the case where a predetermined time has elapsed, the operation state of the image processing apparatus 10 shifts to the sleep mode.

In the first exemplary embodiment, control of power supply is executed in such a manner that the person presence sensor 28, the access camera 29, and the recognition camera 30 cooperate with each other. More specifically, power is constantly supplied to the person presence sensor 28; however, control is performed in accordance with detection information supplied from the person presence sensor 28 in such a manner that power is sequentially supplied to the access camera 29 and to the recognition camera 30.

In the following, a power-supply control routine according to the first exemplary embodiment will be described in accordance with a flowchart illustrated in FIG. 11. In the power-supply control routine, the person presence sensor 28, the access camera 29, and the recognition camera 30 cooperate with each other.

The processing procedure illustrated in FIG. 11 is started when the image processing apparatus 10 enters the sleep mode. While the image processing apparatus 10 is in the sleep mode, no power is supplied to the greater part of the main controller 200, the UI touch panel 216, various devices, the access camera 29, and the recognition camera 30. (That is, the greater part of the main controller 200, the UI touch panel 216, the various devices, the access camera 29, and the recognition camera 30 are in the power-supply shutoff state.) In contrast, power is supplied to the monitoring controller 24 and the person presence sensor 28 in the main controller 200. (That is, the monitoring controller 24 and the person presence sensor 28 are in the power supply state.) The power is about, for example, 0.5 W. (The power here corresponds to "LEVEL 1" in FIG. 11).

In step S100, it is determined whether or not the person presence sensor 28 detects a moving object. If YES in step S100, the procedure proceeds to step S102. In step S102, the access camera 29 is started up. After the access camera 29 is started up, the power becomes larger than LEVEL 1. (The power in step S102 corresponds to "LEVEL 2" in FIG. 11.)

In step S104, the direction in which the moving object is moving is determined in accordance with images captured by the access camera 29. As the direction in which the moving object is moving, the direction in which the moving object is expected to move is determined by recognizing at least the form of a person and by detecting the orientation of the person and the orientation of the face of the person. (This determination is performed by image analysis.)

In step S106, it is determined whether or not it is predicted that the moving object (the user 60) is approaching the image processing apparatus 10 by the image analysis based on the images captured by the access camera 29. The reason that the determination in step S106 is made on the basis of "prediction" is that the determination is made assuming that the user 60 will soon move straight in the direction determined in step S104. For example, the moving object may change its course with respect to the direction determined in step S104 (that is, the moving object may turn right/left, make a U-turn, or the like). This is why the determination in step S106 is made on the basis of "prediction".

If NO in step S106, that is, when it is predicted that the moving object is not moving toward the image processing apparatus 10, the procedure proceeds to step S108. In step S108, power supply to the access camera 29 is shut off, and the procedure returns to step S100. In this case, the power shifts from "LEVEL 2" to "LEVEL 1".

In step S106, NO is obtained when the moving object detected by the person presence sensor 28 is, for example, a moving object that simply passes by the image processing apparatus 10. In the case where such a moving object is already away from the image processing apparatus 10, step S100 is repeated. In contrast, in the case where the moving object stays in the detection area of the person presence sensor 28 (the detection area F illustrated in FIG. 7), the access camera 29 is started up again.

Note that a delay time may be set before power supply to the access camera 29 is shut off in step S108, and image analysis of the moving object in the direction of movement may be continued during the delay time after the procedure returns to step S100.

If YES in step S106, that is, when it is predicted that the moving object is moving toward the image processing apparatus 10 (or it is predicted that the moving object is approaching the image processing apparatus 10), the procedure proceeds to step S110. In step S110, power is supplied to the main controller 200, the UI touch panel 216, and the recognition camera 30. As a result, the power becomes larger than LEVEL 2. (The power in step S110 corresponds to "LEVEL 3" in FIG. 11.)

In step S112, capturing of images is started by using the recognition camera 30. Then, the procedure proceeds to step S114. In step S114, it is determined whether or not the moving object (the user 60) is still approaching the image processing apparatus 10. This is because the moving object is once moving toward the image processing apparatus 10 but later may change its course. If NO in step S114, the procedure proceeds to step S116. In step S116, power supply to the UI touch panel 216 and the recognition camera 30 is shut off. Then, the procedure returns to step S104. In this case, the power shifts from "LEVEL 3" to "LEVEL 2".

If YES in step S114, the procedure proceeds to step S118. In step S118, it is determined whether or not the user 60 will soon face the UI touch panel 216. That is, it may be determined whether or not the user 60 will soon face the UI touch panel 216, by analysis of an image captured by the recognition camera 30 and execution of capturing of an image (especially, an image of a face) of the user 60.

If NO in step S118, that is, when it is determined that capturing of an image of the user 60 is unsuccessful, the procedure proceeds to step S120. In step S120, it is determined whether or not a predetermined time has elapsed. If NO in step S120, the procedure returns to step S114. Then, the above-described processing procedure (steps S114, S118, and S120) is repeated.

If YES in step S120, it is understood that the predetermined time has elapsed in a state in which the user 60 is approaching the image processing apparatus 10 but does not face the UI touch panel 216. Then, the procedure proceeds to step S116. In step S116, power supply to the UI touch panel 216 and the recognition camera 30 is shut off. Then, the procedure returns to step S104. In this case, the power shifts from "LEVEL 3" to "LEVEL 2".

Here, YES is obtained in step S120, for example, in a state in which the user 60 is waiting for a printout that has been commanded from the PC 21 or the like on the desk of the user 60 at a position that is shifted from the front side of the image processing apparatus 10 (that is, at a position near the paper outlet tray), in a state in which the user 60 is working near the image processing apparatus 10 in order to replace consumables such as toner or recording paper, or the like.

On the other hand, if YES in step S118, that is, when it is determined that capturing of, for example, an image of a face of the user 60 is successful and the user 60 will soon face the UI touch panel 216, the procedure proceeds to step S122. In step S122, identity recognition processing (or authentication processing) is executed. In the identity recognition processing, the captured image of a face is analyzed and compared with data stored in advance in the face image database stored on the ROM 208 or the HDD 218 in the main controller 200, and it is determined whether or not the user 60 is a user with the right to use the image processing apparatus 10.

Note that information used for the authentication processing is not limited to images of faces. Identification information of the bar code, the QR Code (registered trademark), or the like of an ID card or a document carried by the user 60 may be read and authentication processing may be performed.

In step S124, the operation of the image processing apparatus 10 is controlled in a management manner determined in accordance with the result of the identity recognition. That is, when the user 60 is an authenticated user, power is supplied to the devices including, as a main part, the image reading unit 238 and the image forming unit 240. When the user 60 is not an authenticated user, a reason or the like why the user 60 has not been authenticated is displayed on the UI touch panel 216. When power is supplied to the devices as described above, the power becomes larger than LEVEL 3. (The power in step S124 corresponds to "LEVEL 4" in FIG. 11.)

When the user 60 is an authenticated user and, for example, in the case where the user 60 has registered a job in advance, power may be supplied only to the devices necessary for the job. Although the power at LEVEL 4 changes in accordance with the types of device and the number of devices to which power is supplied, the power at LEVEL 4 is larger than the power at LEVEL 3.

FIGS. 12A to 14F are examples of action patterns according to the flowchart illustrated in FIG. 11. Note that symbols S1 to S4 illustrated in FIGS. 12A to 14F denote steps that correspond to some of the steps in FIG. 11, and "Y" or "N" at the end of each symbol represents YES or NO in the step corresponding to the symbol.

Here, there are relationships between the symbols S1 to S4 and some of the steps in FIG. 11 as follows: the symbols S1, S2, S3, and S4 correspond to steps S100, S106, S114, and S118 in FIG. 11, respectively.

Figure 12A:
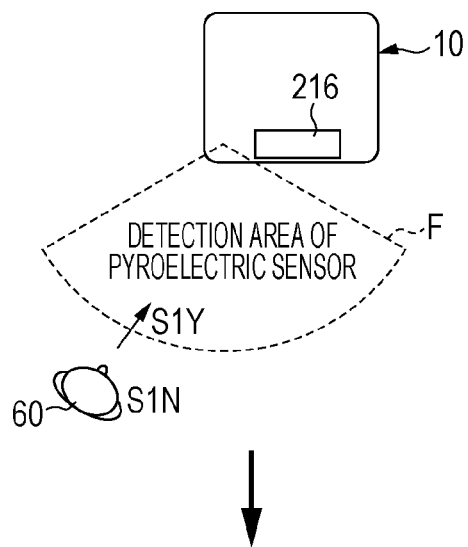
FIGS. 12A to 12C are plan views of the image processing apparatus, the plan views illustrating a first action flow according to the flowchart of FIG. 11.
Figure 12B:
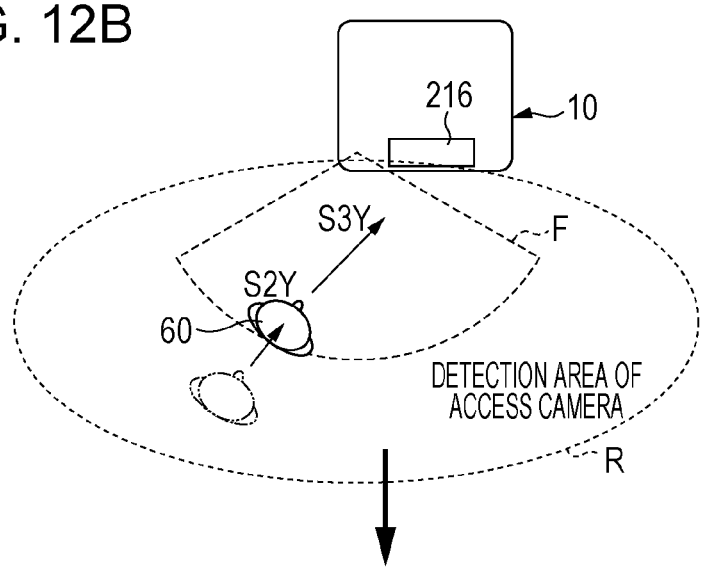
Figure 12C:
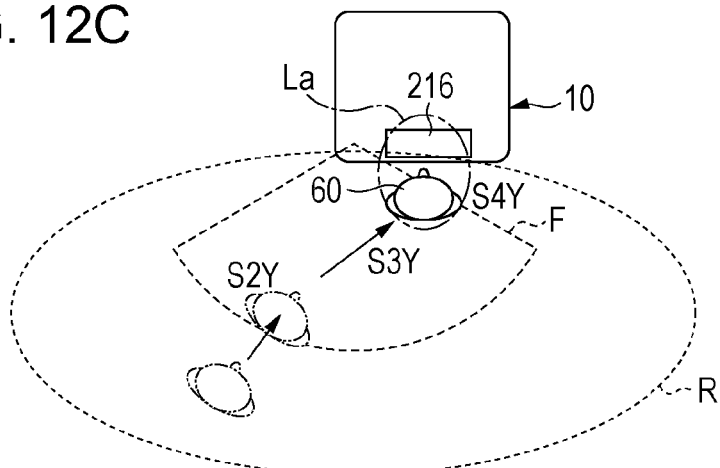

FIGS. 12A to 12C illustrate, in the simplest manner, a transition diagram of power supply states of the person presence sensor 28, access camera 29, and recognition camera 30 when the user 60 is approaching the image processing apparatus 10.

In FIG. 12A, power is supplied only to the person presence sensor 28. The user 60 is outside the detection area F of the person presence sensor 28, and the person presence sensor 28 has not yet detected a moving object (NO in step S100 or "S1N").

FIG. 12B illustrates a state in which the user 60 (drawn with solid lines) enters the detection area F of the person presence sensor 28. At this point in time, the person presence sensor 28 detects a moving object, which is the user 60 (YES in step S100 or "S1Y"). Thus, power is supplied to the access camera 29.

Images of the user 60 are captured by the access camera 29 and the images are analyzed. As a result, when it is predicted that the user 60 is approaching the image processing apparatus 10 (YES in step S106 or "S2Y"), power is supplied to the recognition camera 30.

FIG. 12C illustrates a state in which the user 60 (drawn with solid lines) is facing the UI touch panel 216 (YES in step S114 or "S3Y", and YES in step S118 or "S4Y"). Capturing of an image of a face is executed by using the recognition camera 30.

FIGS. 13A to 13E illustrate a transition diagram of power supply states of the person presence sensor 28, access camera 29, and recognition camera 30 in the case where the user 60 changes his/her course after entering the detection area F of the person presence sensor 28.

FIG. 13A is the same as FIG. 12A, and FIG. 13B is the same as FIG. 12B.

FIG. 13C illustrates a state in which the user 60 (drawn with solid lines) has approached the image processing apparatus 10 once after entering the detection area F of the person presence sensor 28 (YES in step S106 or "S2Y"), but later changes his/her course and is not moving toward the image processing apparatus 10 (NO in step S114 or "S3N").

However, FIG. 13D illustrates a state in which the user 60 (drawn with solid lines) has changed his/her course again (YES in step S114 or "S3Y") and is facing the UI touch panel 216 and power is supplied to the recognition camera 30 (YES in step S118 or "S4Y").

In contrast, FIG. 13E illustrates a state that continues from the state illustrated in FIG. 13C. FIG. 13E illustrates a state in which the user 60 (drawn with solid lines) has left the detection area F of the person presence sensor 28 and power supply to the access camera 29 is shut off (NO in step S106 or "S2N").

FIGS. 14A to 14F illustrate various actions of the user 60, including the ones illustrated in FIGS. 12A to 13E.

Figure 14A:
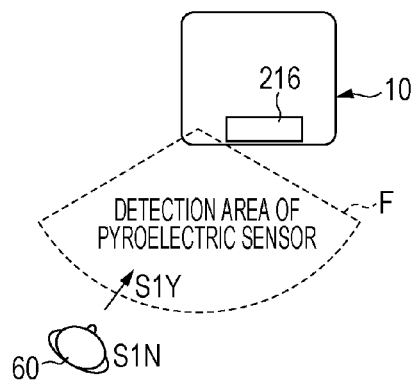
FIGS. 14A to 14F are plan views of the image processing apparatus, the plan views illustrating a third action flow according to the flowchart of FIG. 11.
Figure 14B:
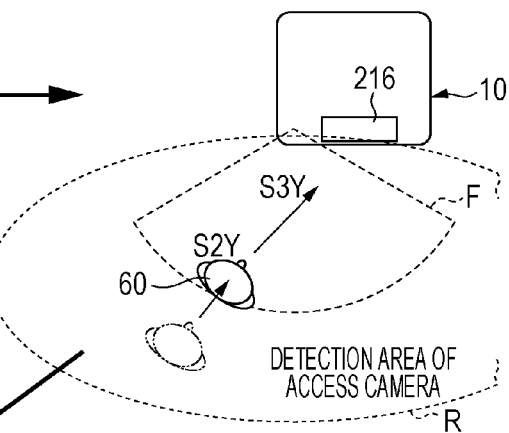

FIG. 14A is the same as FIG. 12A, and FIG. 14B is the same as FIG. 12B.

Figure 14C:
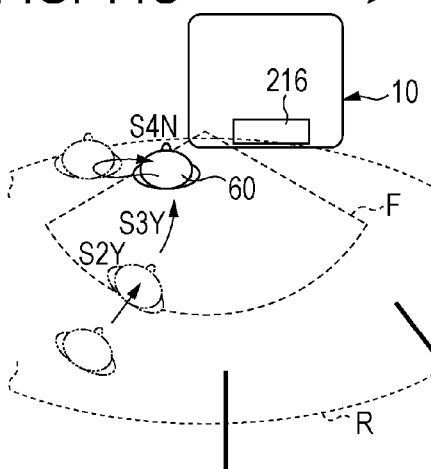

FIG. 14C illustrates a state in which the user 60 (drawn with solid lines) has approached the image processing apparatus 10 after being detected by the person presence sensor 28 but power is not supplied to the recognition camera 30 because the user 60 has moved toward a position different from the position at which the user 60 faces the UI touch panel 216 (YES in step S114 or "S3Y", and then NO in step S118 or "S4N"). In this case, the user 60 may leave the detection area F of the person presence sensor 28.

Here, when the user 60 stops moving, the person presence sensor 28 does not detect the user 60; however, the access camera 29 may still recognize presence of the user 60. Furthermore, even when the user 60 (drawn with solid lines) moves to the left on the sheet in FIG. 14C and leaves the detection area F of the person presence sensor 28, the access camera 29 may recognize presence of the user 60 in the detection area R.

Figure 14D:
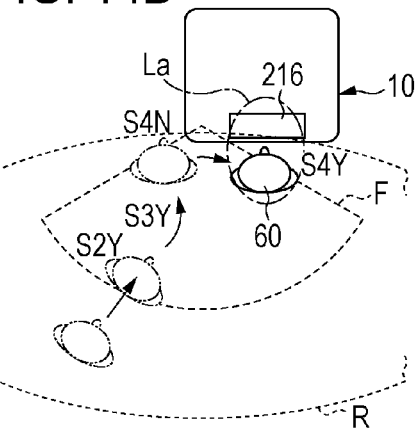

FIG. 14D illustrates a state in which the user 60 (drawn with solid lines) has moved from the position illustrated in FIG. 14C and is facing the UI touch panel 216 (YES in step S118 or "S4Y").

Figure 14E:
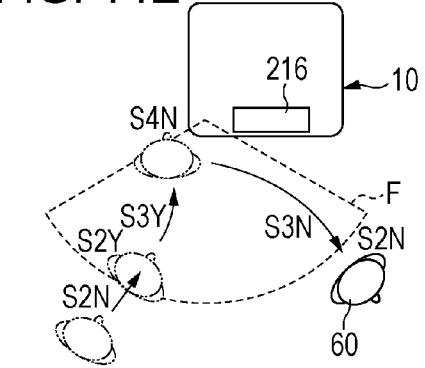

FIG. 14E illustrate a state in which the user 60 (drawn with solid lines) has moved from the position illustrated in FIG. 14C and has left the detection area F of the person presence sensor 28 (NO in step S114 or "S3N", and then NO in step S106 or "S2N").

Figure 14F:
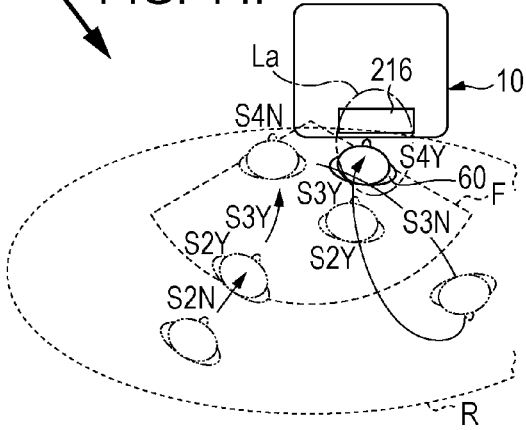

FIG. 14F illustrates a state in which the user 60 (drawn with solid lines) has moved from the position illustrated in FIG. 14C, has left the detection area F of the person presence sensor 28 as illustrated in FIG. 14E, and then has made a U-turn and is facing the UI touch panel 216 (YES in step S106 or "S2Y", YES in step S114 or "S3Y", and then YES in step S118 or "S4Y").

Note that the action patterns illustrated in FIG. 12A to 14F are just examples. The power supply control according to the first exemplary embodiment and performed in such a manner that the person presence sensor 28, the access camera 29, and the recognition camera 30 cooperate with each other is not limited to the action patterns illustrated in FIG. 12A to 14F and may be applied to various action patterns of a moving object. Moreover, the power supply control may also be performed in a case where, in addition to the user 60 illustrated in FIG. 12A to 14F, there is a moving object that passes near the user 60 or plural users 60 are approaching the image processing apparatus 10 simultaneously.

In the first exemplary embodiment, the image processing apparatus 10 is equipped with the person presence sensor 28 having the detection area F, the access camera 29 having the detection area R, and the recognition camera 30 having the detection area La. In the case where a moving object (the user 60) is approaching the image processing apparatus 10 while the image processing apparatus 10 is in the sleep mode, the person presence sensor 28, the access camera 29, and the recognition camera 30 cooperate with each other. As a result, before the user 60 faces the UI touch panel 216 of the image processing apparatus 10, devices of the image processing apparatus 10 that are necessary for operation receive power and are made to be in a state in which the necessary devices are ready for operation (that is, the image processing apparatus 10 is in the standby mode) with minimum power supply.

The detection area R of the access camera 29 is broader than the detection area F of the person presence sensor 28. Thus, even when a moving object (the user 60) moves into the dead-angle area of the person presence sensor 28 after the person presence sensor 28 detects the moving object, the movement of the user 60 may be recognized assuredly (for example, the direction in which the user 60 is moving may be predicted).

Second Embodiment

In the following, a second exemplary embodiment will be described. In the second exemplary embodiment, description of a configuration the same as that of the first exemplary embodiment will be omitted.

A characteristic of the second exemplary embodiment is a timing at which power is supplied to the recognition camera 30 (the recognition camera 30 is energized). The other configuration and operation are the same as those of the first exemplary embodiment.

In the following, a power-supply control routine according to the second exemplary embodiment will be described in accordance with a flowchart illustrated in FIG. 15. In the power-supply control routine, the person presence sensor 28, the access camera 29, and the recognition camera 30 cooperate with each other.

The processing procedure illustrated in FIG. 15 is started when the image processing apparatus 10 enters the sleep mode. While the image processing apparatus 10 is in the sleep mode, no power is supplied to the greater part of the main controller 200, the UI touch panel 216, various devices, the access camera 29, and the recognition camera 30. (That is, the greater part of the main controller 200, the UI touch panel 216, the various devices, the access camera 29, and the recognition camera 30 are in the power-supply shutoff state.) In contrast, power is supplied to the monitoring controller 24 and the person presence sensor 28 in the main controller 200. (That is, the monitoring controller 24 and the person presence sensor 28 are in the power supply state.) The power is about, for example, 0.5 W. (The power here corresponds to "LEVEL 1" in FIG. 15).

In step S100A, it is determined whether or not the person presence sensor 28 detects a moving object. If YES in step S100A, the procedure proceeds to step S102A. In step S102A, the access camera 29 and the recognition camera 30 are started up. After the access camera 29 and the recognition camera 30 are started up, the power becomes larger than LEVEL 1. (The power in step S102A corresponds to "LEVEL 2" in FIG. 15.)

In step S104A, the direction in which the moving object is moving is determined in accordance with images captured by the access camera 29. As the direction in which the moving object is moving, the direction in which the moving object is expected to move is determined by recognizing at least the form of a person and by detecting the orientation of the person and the orientation of the face of the person. (This determination is performed by image analysis.)

In step S106A, it is determined whether or not it is predicted that the moving object (the user 60) is approaching the image processing apparatus 10 by the image analysis based on the images captured by the access camera 29. The reason that the determination in step S106A is made on the basis of "prediction" is that the determination is made assuming that the user 60 will soon move straight in the direction determined in step S104A. For example, the moving object may change its course with respect to the direction determined in step S104A (that is, the moving object may turn right/left, make a U-turn, or the like). This is why the determination in step S106A is made on the basis of "prediction".

If NO in step S106A, that is, when it is predicted that the moving object is not moving toward the image processing apparatus 10, the procedure proceeds to step S108A. In step S108A, power supply to the access camera 29 and the recognition camera 30 is shut off, and the procedure returns to step S100A. In this case, the power shifts from "LEVEL 2" to "LEVEL 1".

In step S106A, NO is obtained when the moving object detected by the person presence sensor 28 is, for example, a moving object that simply passes by the image processing apparatus 10. In the case where such a moving object is already away from the image processing apparatus 10, step S100A is repeated. In contrast, in the case where the moving object stays in the detection area of the person presence sensor 28 (the detection area F illustrated in FIG. 7), the access camera 29 and the recognition camera 30 are started up again.

Note that a delay time may be set before power supply to the access camera 29 and the recognition camera 30 is shut off in step S108A, and image analysis of the moving object in the direction of movement may be continued during the delay time after the procedure returns to step S100A. This makes it possible to compensate the dead-angle area of the person presence sensor 28.

If YES in step S106A, that is, when it is predicted that the moving object is moving toward the image processing apparatus 10 (or it is predicted that the moving object is approaching the image processing apparatus 10), the procedure proceeds to step S110A. In step S110A, power is supplied to the main controller 200 and the UI touch panel 216. As a result, the power becomes larger than LEVEL 2. (The power in step S110A corresponds to "LEVEL 3" in FIG. 15.)

In step S112A, capturing of images is started by using the recognition camera 30. Then, the procedure proceeds to step S114A. In step S114A, it is determined whether or not the moving object (the user 60) is still approaching the image processing apparatus 10. This is because the moving object is once moving toward the image processing apparatus 10 but later may change its course. If NO in step S114A, the procedure proceeds to step S116A. In step S116A, power supply to the UI touch panel 216 is shut off. Then, the procedure returns to step S104A. In this case, the power shifts from "LEVEL 3" to "LEVEL 2".

If YES in step S114A, the procedure proceeds to step S118A. In step S118A, it is determined whether or not the user 60 will soon face the UI touch panel 216. That is, it may be determined whether or not the user 60 will soon face the UI touch panel 216, by analysis of an image captured by the recognition camera 30 and execution of capturing of an image (especially, an image of a face) of the user 60.

If NO in step S118A, that is, when it is determined that capturing of an image of the user 60 is unsuccessful, the procedure proceeds to step S120A. In step S120A, it is determined whether or not a predetermined time has elapsed. If NO in step S120A, the procedure returns to step S114A. Then, the above-described processing procedure (steps S114A, S118A, and S120A) is repeated.

If YES in step S120A, it is understood that the predetermined time has elapsed in a state in which the user 60 is approaching the image processing apparatus 10 but does not face the UI touch panel 216. Then, the procedure proceeds to step S116A. In step S116A, power supply to the UI touch panel 216 is shut off. Then, the procedure returns to step S104A. In this case, the power shifts from "LEVEL 3" to "LEVEL 2".

Here, YES is obtained in step S120A, for example, in a state in which the user 60 is waiting for a printout that has been commanded from the PC 21 or the like on the desk of the user 60 at a position that is shifted from the front side of the image processing apparatus 10 (that is, at a position near the paper outlet tray), in a state in which the user 60 is working near the image processing apparatus 10 in order to replace consumables such as toner or recording paper, or the like.

On the other hand, if YES in step S118A, that is, when it is determined that capturing of, for example, an image of a face of the user 60 is successful and the user 60 will soon face the UI touch panel 216, the procedure proceeds to step S122A. In step S122A, identity recognition processing (or authentication processing) is executed. In the identity recognition processing, the captured image of a face is analyzed and compared with data stored in advance in the face image database stored on the ROM 208 or the HDD 218 in the main controller 200, and it is determined whether or not the user 60 is a user with the right to use the image processing apparatus 10.

Note that information used for the authentication processing is not limited to images of faces. Identification information of the bar code, the QR Code (registered trademark), or the like of an ID card or a document carried by the user 60 may be read and authentication processing may be performed.

In step S124A, the operation of the image processing apparatus 10 is controlled in a management manner determined in accordance with the result of the identity recognition. That is, when the user 60 is an authenticated user, power is supplied to the devices including, as a main part, the image reading unit 238 and the image forming unit 240. When the user 60 is not an authenticated user, a reason or the like why the user 60 has not been authenticated is displayed on the UI touch panel 216. When power is supplied to the devices as described above, the power becomes larger than LEVEL 3. (The power in step S124A corresponds to "LEVEL 4" in FIG. 15.)

When the user 60 is an authenticated user and, for example, in the case where the user 60 has registered a job in advance, power may be supplied only to the devices necessary for the job. Although the power at LEVEL 4 changes in accordance with the types of device and the number of devices to which power is supplied, the power at LEVEL 4 is larger than the power at LEVEL 3.

FIGS. 16A to 18F are examples of action patterns according to the flowchart illustrated in FIG. 15. Note that symbols S1 to S4 illustrated in FIGS. 16A to 18F denote steps that correspond to some of the steps in FIG. 15, and "Y" or "N" at the end of each symbol represents YES or NO in the step corresponding to the symbol.

Here, there are relationships between the symbols S1 to S4 and some of the steps in FIG. 15 as follows: the symbols S1, S2, S3, and S4 correspond to steps S100A, S106A, S114A, and S118A in FIG. 15, respectively.

Figure 16A:
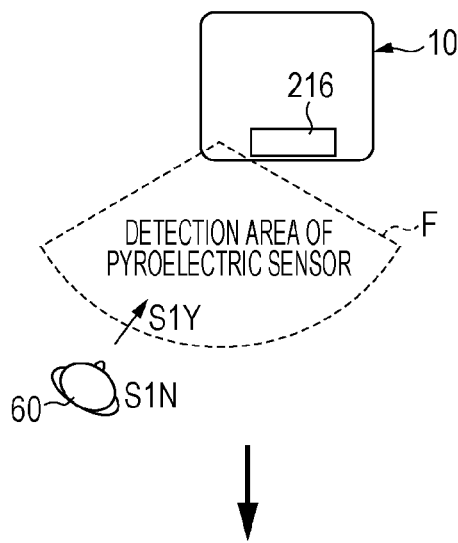
FIGS. 16A to 16C are plan views of the image processing apparatus, the plan views illustrating a first action flow according to the flowchart of FIG. 15.
Figure 16B:
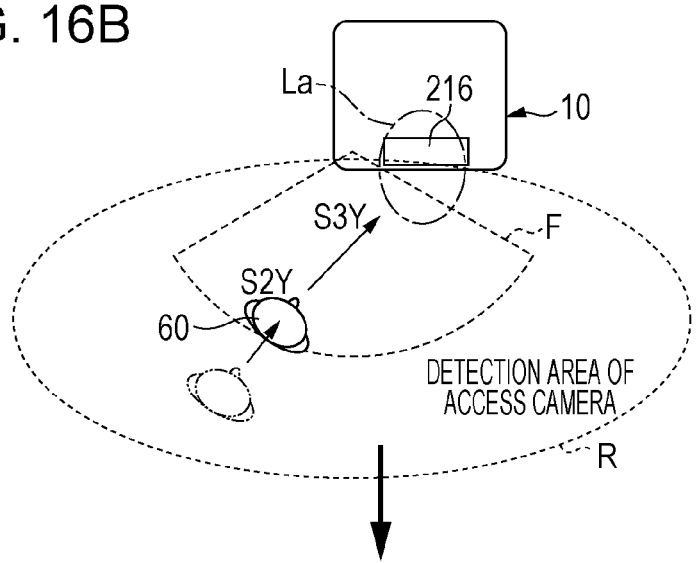
Figure 16C:
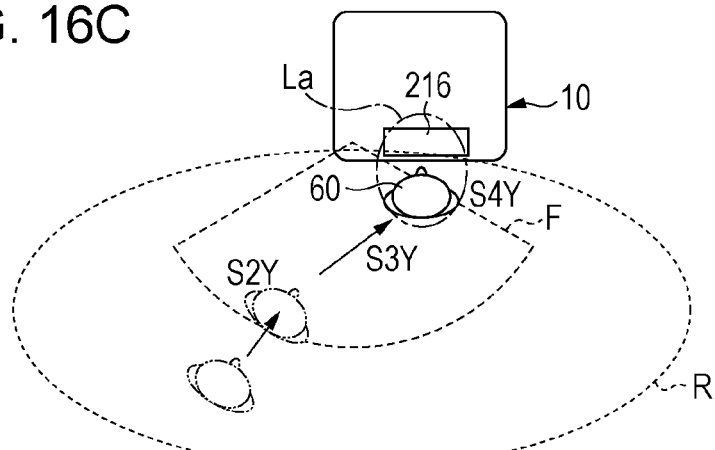

FIGS. 16A to 16C illustrate, in the simplest manner, a transition diagram of power supply states of the person presence sensor 28, access camera 29, and recognition camera 30 when the user 60 is approaching the image processing apparatus 10.

In FIG. 16A, power is supplied only to the person presence sensor 28. The user 60 is outside the detection area F of the person presence sensor 28, and the person presence sensor 28 has not yet detected a moving object (NO in step S100A or "S1N").

FIG. 16B illustrates a state in which the user 60 (drawn with solid lines) enters the detection area F of the person presence sensor 28. At this point in time, the person presence sensor 28 detects a moving object, which is the user 60 (YES in step S100A or "S1Y"). Thus, power is supplied to the access camera 29 and the recognition camera 30.

Images of the user 60 are captured by the access camera 29 and the images are analyzed. As a result, when it is predicted that the user 60 is approaching the image processing apparatus 10 (YES in step S106A or "S2Y"), power is supplied to the main controller 200 and the UI touch panel 216.

FIG. 16C illustrates a state in which the user 60 (drawn with solid lines) is facing the UI touch panel 216 (YES in step S114A or "S3Y", and YES in step S118A or "S4Y"). Capturing of an image of a face is executed by using the recognition camera 30.

FIGS. 17A to 17E illustrate a transition diagram of power supply states of the person presence sensor 28, access camera 29, and recognition camera 30 in the case where the user 60 changes his/her course after entering the detection area F of the person presence sensor 28.

Figure 17A:
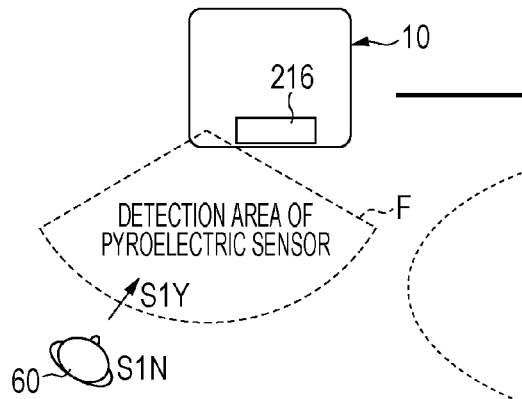
FIGS. 17A to 17E are plan views of the image processing apparatus, the plan views illustrating a second action flow according to the flowchart of FIG. 15.
Figure 17B:
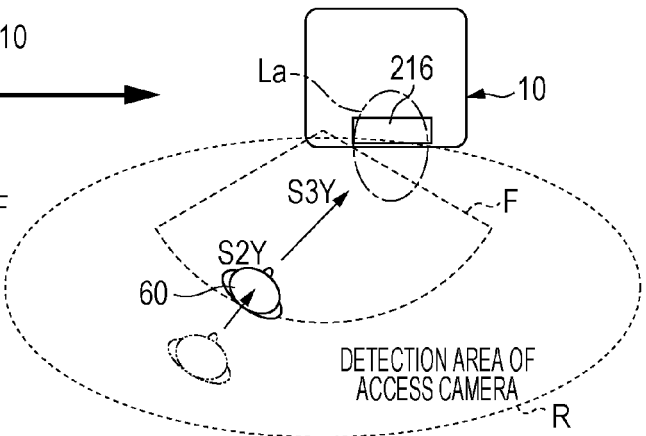

FIG. 17A is the same as FIG. 16A, and FIG. 17B is the same as FIG. 16B.

Figure 17C:
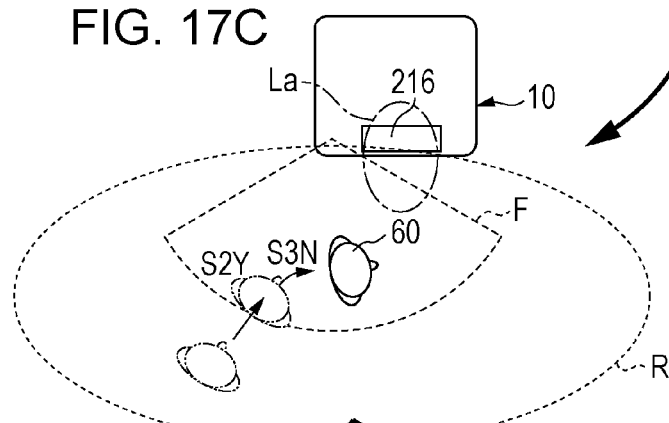

FIG. 17C illustrates a state in which the user 60 (drawn with solid lines) has approached the image processing apparatus 10 once after entering the detection area F of the person presence sensor 28 (YES in step S106A or "S2Y"), but later changes his/her course and is not moving toward the image processing apparatus 10 (NO in step S114A or "S3N").

Figure 17D:
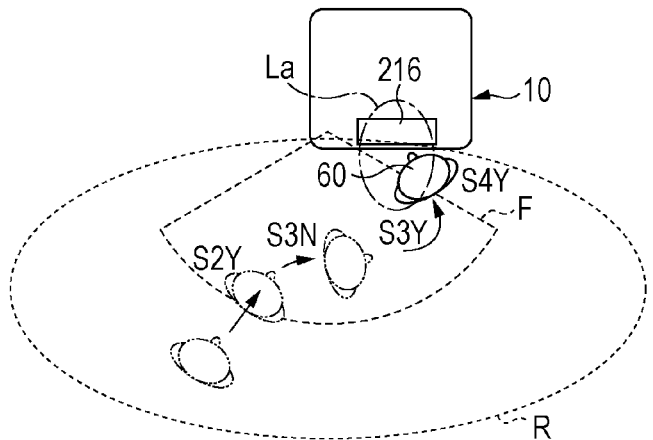

However, FIG. 17D illustrates a state in which the user 60 (drawn with solid lines) has changed his/her course again (YES in step S114A or "S3Y") and is facing the UI touch panel 216 and power is supplied to the recognition camera 30 (YES in step S118A or "S4Y").

Figure 17E:
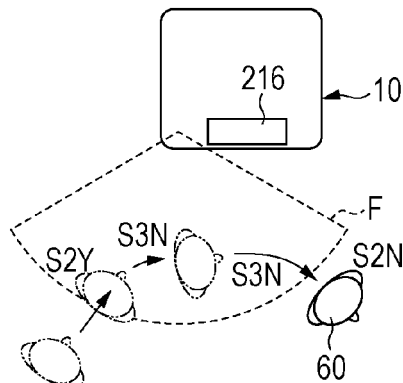

In contrast, FIG. 17E illustrates a state that continues from the state illustrated in FIG. 17C. FIG. 17E illustrates a state in which the user 60 (drawn with solid lines) has left the detection area F of the person presence sensor 28 and power supply to the access camera 29 and the recognition camera 30 is shut off (NO in step S106A or "S2N").

FIGS. 18A to 18F illustrate various actions of the user 60, including the ones illustrated in FIGS. 16A to 17E.

Figure 18A:
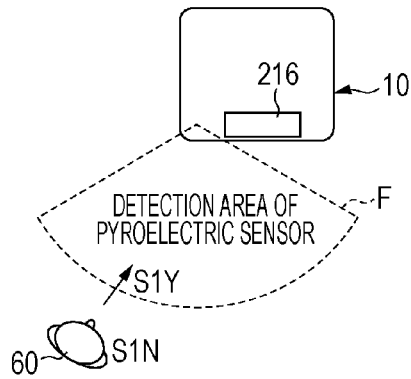
FIGS. 18A to 18F are plan views of the image processing apparatus, the plan views illustrating a third action flow according to the flowchart of FIG. 15.
Figure 18B:
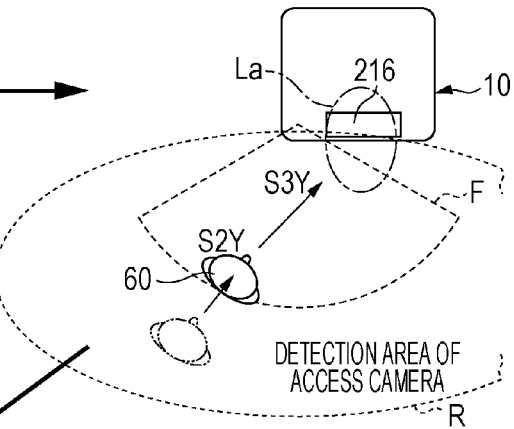

FIG. 18A is the same as FIG. 16A, and FIG. 18B is the same as FIG. 16B.

Figure 18C:
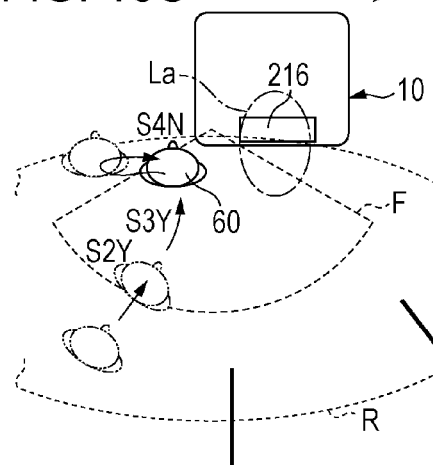

FIG. 18C illustrates a state in which the user 60 (drawn with solid lines) has approached the image processing apparatus 10 after being detected by the person presence sensor 28 and the user 60 has moved toward a position different from the position at which the user 60 faces the UI touch panel 216 (YES in step S114A or "S3Y", and then NO in step S118A or "S4N"). In this case, the user 60 may leave the detection area F of the person presence sensor 28.

Here, when the user 60 stops moving, the person presence sensor 28 does not detect the user 60; however, the access camera 29 may still recognize presence of the user 60. Furthermore, even when the user 60 (drawn with solid lines) moves to the left on the sheet in FIG. 18C and leaves the detection area F of the person presence sensor 28, the access camera 29 may recognize presence of the user 60 in the detection area R.

Figure 18D:
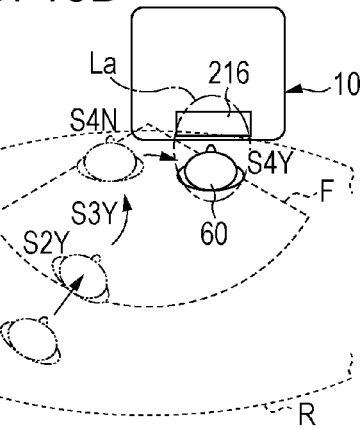

FIG. 18D illustrates a state in which the user 60 (drawn with solid lines) has moved from the position illustrated in FIG. 18C and is facing the UI touch panel 216 (YES in step S118A or "S4Y").

Figure 18E:
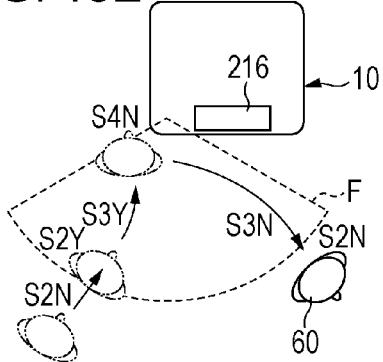

FIG. 18E illustrate a state in which the user 60 (drawn with solid lines) has moved from the position illustrated in FIG. 18C and has left the detection area F of the person presence sensor 28 (NO in step S114A or "S3N", and then NO in step S106A or "S2N").

Figure 18F:
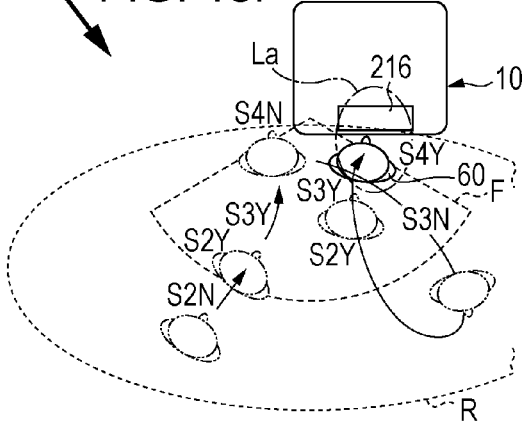

FIG. 18F illustrates a state in which the user 60 (drawn with solid lines) has moved from the position illustrated in FIG. 18C, has left the detection area F of the person presence sensor 28 as illustrated in FIG. 18E, and then has made a U-turn and is facing the UI touch panel 216 (YES in step S106A or "S2Y", YES in step S114A or "S3Y", and then YES in step S118A or "S4Y").

Note that the action patterns illustrated in FIG. 16A to 18F are just examples. The power supply control according to the second exemplary embodiment and performed in such a manner that the person presence sensor 28, the access camera 29, and the recognition camera 30 cooperate with each other is not limited to the action patterns illustrated in FIG. 16A to 18F and may be applied to various action patterns of a moving object. Moreover, the power supply control may also be performed in a case where, in addition to the user 60 illustrated in FIG. 16A to 18F, there is a moving object that passes near the user 60 or plural users 60 are approaching the image processing apparatus 10 simultaneously.

In the second exemplary embodiment, the image processing apparatus 10 is equipped with the person presence sensor 28 having the detection area F, the access camera 29 having the detection area R, and the recognition camera 30 having the detection area La. In the case where a moving object (the user 60) is approaching the image processing apparatus 10 while the image processing apparatus 10 is in the sleep mode, the person presence sensor 28, the access camera 29, and the recognition camera 30 cooperate with each other.

The detection area R of the access camera 29 is broader than the detection area F of the person presence sensor 28. Thus, even when a moving object (the user 60) moves into the dead-angle area of the person presence sensor 28 after the person presence sensor 28 detects the moving object, the movement of the user 60 may be recognized assuredly (for example, the direction in which the user 60 is moving may be predicted).

The first and second exemplary embodiments include the following examples.

(Example 1) Central control is performed by the main controller 200 for devices such as the image forming unit 240, the image reading unit 238, the facsimile communication control circuit 236, the UI touch panel 216, and the like. The image processing apparatus 10 has a partial power saving function through which devices that are not being used and the main controller 200 are individually made to enter a sleep state.

(Example 2) Instead of a pyroelectric type sensor, which is applied as the first sensor 28, a two-dimensional arrangement heat-source detector or a reflection type detector may be applied. The two-dimensional arrangement heat-source detector is given pixelated configuration by two-dimensionally arranging plural heat-source detection elements that output an electric signal based on at least heat quantity received from a heat source. The reflection type detector detects whether or not there is a moving object in a detection area. Moreover, plural different types of sensors may be used together.

(Example 3) The following analysis techniques (a) to (c) may be applied as techniques to realize the function of the access camera 29.

(a) The distance to the user is determined in accordance with a change in the area of a detected person.

(b) Even when a captured image is a still image, a face of a person is specified in the still image and the direction in which the person is moving (the vector) is predicted in accordance with the orientation of the face.

(c) When capturing of images is performed at plural different locations, differences in position coordinates are analyzed.

Note that, in the first and second exemplary embodiments, the image processing apparatuses 10 are used as targets for which power supply control is performed. However, targets are not limited to the image processing apparatuses 10. Processing apparatuses for which power supply control is executed in accordance with the type of moving object (a user or a non-user), predicted movement of a moving object, and a movement history of the moving object may also be targets of the first and second exemplary embodiments. Examples of such processing apparatuses are vending machines, security systems for buildings, ticket vending machines, automatic ticket gates, and the like.

In this case, there may be a case in which a person recognition apparatus described below is necessary. The person recognition apparatus includes a detector that detects a moving object, a first imaging unit that captures an image of a specific area including a predicted course of the moving object at the time when the detector detects the moving object, a second imaging unit to which power is supplied in the case where it is confirmed that the moving object is approaching the person recognition apparatus in accordance with image information of the image of the specific area captured by the first imaging unit and that captures a characteristic image of the moving object, and an identity recognition unit that performs identity recognition in accordance with information of the characteristic image captured by the second imaging unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply control apparatus comprising:
   a pyroelectric sensor configured to sense a person when the power supply control apparatus is in a power saving state;

a first camera configured to consume higher power than the sensor and configured to capture a first image of the person;

a second camera, separate from the first camera, configured to capture a second image used to recognize the person;

a first processor configured to execute a first state controller configured to cause the first camera to be in a power supply state in response to the pyroelectric sensor sensing the person; and a second processor configured to execute a second state controller configured to cause the second camera to be in a power supply state in response to determining, from an image analysis of the captured first image of the person, that the person is approaching the power supply control apparatus, wherein the second processor comprises a main controller of an image processing apparatus, which includes the power supply control apparatus, and wherein the second processor is configured to switch to a power supply state in response to determining, from the image analysis of the captured first image of the person, that the person is approaching the image processing apparatus.

2. The power supply control apparatus of claim 1, wherein the first camera is configured to capture the first image of the person in a first detection area and the second camera is configured to capture the second image in a second detection area, and wherein the first detection area and the second detection area have different sizes.

3. The power supply control apparatus of claim 1, wherein the first camera and the second camera are located at different positions on an image processing apparatus which includes the power supply control apparatus.

4. The power supply control apparatus of claim 1, wherein the second processor is configured to cause a user interface of the image processing apparatus to be in a power supply state in response to determining, from the image analysis of the captured first image of the person, that the person is approaching the image processing apparatus.

5. The power supply control apparatus of claim 4, wherein the second processor is configured to, in response to determining that the person will face the user interface, execute identity recognition processing using an image analysis of the captured second image.

6. The power supply control apparatus of claim 1, wherein the image processing apparatus is configured to perform at least one of a print operation or a fax operation.

7. An image processing apparatus comprising:
a pyroelectric sensor configured to sense a person when the image processing apparatus is in a power saving state;

a first camera configured to consume higher power than the sensor and configured to capture a first image of the person;

a second camera, separate from the first camera, configured to capture a second image used to recognize the person;

a first processor configured to execute a first state controller configured to cause the first camera to be in a power supply state in response to the pyroelectric sensor sensing the person; and a second processor configured to execute a second state controller configured to cause the second camera to be in a power supply state in response to determining, from an image analysis of the captured first image of the person, that the person is approaching the image processing apparatus, wherein the second processor comprises a main controller of the image processing apparatus, and wherein the second processor is configured to switch to a power supply state in response to determining, from the image analysis of the captured first image of the person, that the person is approaching the image processing apparatus.

8. The image processing apparatus of claim 7, wherein the first camera is configured to capture the first image of the person in a first detection area and the second camera is configured to capture the second image in a second detection area, and wherein the first detection area and the second detection area have different sizes.

9. The image processing apparatus of claim 7, wherein the first camera and the second camera are located at different positions on the image processing apparatus.

10. A non-transitory computer readable medium storing a program causing a computer to execute a process, the process comprising:

sensing a person, using a pyroelectric sensor, when an image processing apparatus is in a power saving state;

capturing a first image of the person approaching using a first imaging unit, the capturing consuming higher power than the sensing;

capturing a second image used to recognize the person using a second imaging unit separate from the first imaging unit;

commanding, by a first state controller, executed a first processor, the first imaging unit to be in a power supply state in response to sensing the person; and commanding, by a second state controller, executed by a second processor, the second imaging unit to be in a power supply state in response to determining, from an image analysis of the captured first image of the person, that the person is approaching the computer, wherein the second processor comprises a main controller of the image processing apparatus, and wherein the process further comprises switching the second processor to a power supply state in response to determining, from the image analysis of the captured first image of the person, that the person is approaching the image processing apparatus.

11. The non-transitory computer readable medium of claim 10, wherein the capturing the first image further comprises capturing the first image in a first detection area of the first imaging unit and the capturing the second image further comprises capturing the second image in a second detection area of the second imaging unit, and wherein the first detection area and the second detection area have different sizes.

12. The non-transitory computer readable medium of claim 10, wherein the first imaging unit and the second imaging unit are located at different positions on the image processing apparatus.

13. The non-transitory computer readable medium of claim 10, wherein the process further comprises causing, using the second processor, a user interface of the image processing apparatus to be in a power supply state in response to determining, from the image analysis of the captured first image of the person, that the person is approaching the image processing apparatus.

14. The non-transitory computer readable medium of claim 13, wherein the process further comprises executing, by the second processor, in response to determining that the person will face the user interface, identity recognition processing using an image analysis of the captured second image.

15. The non-transitory computer readable medium of claim 10, wherein the process further comprises performing, using the image processing apparatus, at least one of a print operation or a fax operation.

\* \* \* \* \*